US010475480B2

(12) United States Patent
Kurokawa et al.

(10) Patent No.: US 10,475,480 B2
(45) Date of Patent: *Nov. 12, 2019

(54) MAGNETIC TAPE HAVING CHARACTERIZED BACK COATING AND MAGNETIC LAYERS

(71) Applicant: FUJIFILM Corporation, Tokyo (JP)

(72) Inventors: Takuto Kurokawa, Minami-ashigara (JP); Norihito Kasada, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/900,242

(22) Filed: Feb. 20, 2018

(65) Prior Publication Data

US 2018/0240494 A1    Aug. 23, 2018

(30) Foreign Application Priority Data

Feb. 20, 2017   (JP) .................. 2017-029507

(51) Int. Cl.
*G11B 5/71*    (2006.01)
*G11B 5/712*   (2006.01)
(Continued)

(52) U.S. Cl.
CPC ............ *G11B 5/71* (2013.01); *G11B 5/00813* (2013.01); *G11B 5/70* (2013.01); *G11B 5/702* (2013.01);
(Continued)

(58) Field of Classification Search
None
See application file for complete search history.

(56) References Cited

U.S. PATENT DOCUMENTS 3,966,686 A    6/1976   Asakura et al.
4,112,187 A    9/1978   Asakura et al.
(Continued)

FOREIGN PATENT DOCUMENTS

DE    101 46 429 A1   3/2002
GB    2495356 A       4/2013
(Continued)

OTHER PUBLICATIONS

English Abstract Translation of JP 2002-367318 A (Year: 2002).*
(Continued)

*Primary Examiner* — Kevin M Bernatz
(74) *Attorney, Agent, or Firm* — Sughrue Mion, PLLC

(57) ABSTRACT

A magnetic tape includes a non-magnetic support; a magnetic layer including ferromagnetic powder and a binding agent on one surface side of the non-magnetic support; and a back coating layer including non-magnetic powder and a binding agent on the other surface side of the non-magnetic support. The center line average surface roughness Ra measured regarding a surface of the magnetic layer is less than or equal to 1.8 nm. The contact angle with respect to 1-bromonaphthalene measured regarding the surface of the magnetic layer is 45.0° to 55.0°. Also, the logarithmic decrement acquired by a pendulum viscoelasticity test performed regarding the surface of the back coating layer is less than or equal to 0.060.

7 Claims, 3 Drawing Sheets

(51) Int. Cl.
  *G11B 5/706* (2006.01)
  *G11B 5/008* (2006.01)
  *G11B 5/735* (2006.01)
  *G11B 5/70* (2006.01)
  *G11B 5/702* (2006.01)

(52) U.S. Cl.
  CPC .......... *G11B 5/70615* (2013.01); *G11B 5/712* (2013.01); *G11B 5/735* (2013.01)

(56) References Cited

U.S. PATENT DOCUMENTS

| | | | |
|---|---|---|---|
| 4,425,404 A | 1/1984 | Suzuki et al. | |
| 4,693,930 A | 9/1987 | Kuo et al. | |
| 4,746,569 A | 5/1988 | Takahashi et al. | |
| 4,825,317 A * | 4/1989 | Rausch | G11B 15/58 360/128 |
| 5,242,752 A | 9/1993 | Isobe et al. | |
| 5,419,938 A | 5/1995 | Kagotani et al. | |
| 5,445,881 A | 9/1995 | Irie | |
| 5,474,814 A | 12/1995 | Komatsu et al. | |
| 5,496,607 A | 3/1996 | Inaba et al. | |
| 5,540,957 A | 7/1996 | Ueda et al. | |
| 5,585,032 A | 12/1996 | Nakata et al. | |
| 5,645,917 A * | 7/1997 | Ejiri | G11B 5/70 428/141 |
| 5,689,384 A | 11/1997 | Albrecht et al. | |
| 5,728,454 A | 3/1998 | Inaba et al. | |
| 5,786,074 A | 6/1998 | Soui | |
| 5,827,600 A | 10/1998 | Ejiri et al. | |
| 6,099,957 A | 8/2000 | Yamamoto et al. | |
| 6,183,606 B1 | 2/2001 | Kuo et al. | |
| 6,207,252 B1 | 3/2001 | Shimomura | |
| 6,228,461 B1 | 5/2001 | Sueki et al. | |
| 6,254,964 B1 | 7/2001 | Saito et al. | |
| 6,261,647 B1 | 7/2001 | Komatsu et al. | |
| 6,268,043 B1 | 7/2001 | Koizumi et al. | |
| 6,496,328 B1 | 12/2002 | Dugas | |
| 6,579,826 B2 | 6/2003 | Furuya et al. | |
| 6,649,256 B1 | 11/2003 | Buczek et al. | |
| 6,686,022 B2 | 2/2004 | Takano et al. | |
| 6,770,359 B2 | 8/2004 | Masaki | |
| 6,791,803 B2 | 9/2004 | Saito et al. | |
| 6,835,461 B1 | 12/2004 | Yamagata et al. | |
| 6,893,746 B1 | 5/2005 | Kirino et al. | |
| 6,921,592 B2 | 7/2005 | Tani et al. | |
| 6,939,606 B2 | 9/2005 | Hashimoto et al. | |
| 6,950,269 B1 | 9/2005 | Johnson | |
| 6,994,925 B2 | 2/2006 | Masaki | |
| 7,014,927 B2 | 3/2006 | Sueki et al. | |
| 7,029,726 B1 | 4/2006 | Chen et al. | |
| 7,153,366 B1 | 12/2006 | Chen et al. | |
| 7,255,908 B2 | 8/2007 | Ishikawa et al. | |
| 7,511,907 B2 | 3/2009 | Dugas et al. | |
| 7,515,383 B2 | 4/2009 | Saito et al. | |
| 7,803,471 B1 | 9/2010 | Ota et al. | |
| 7,839,599 B2 | 11/2010 | Bui et al. | |
| 8,000,057 B2 | 8/2011 | Bui et al. | |
| 8,279,739 B2 | 10/2012 | Kanbe et al. | |
| 8,524,108 B2 | 9/2013 | Hattori | |
| 8,535,817 B2 * | 9/2013 | Imaoka | G11B 5/70 428/844 |
| 8,576,510 B2 | 11/2013 | Cherubini et al. | |
| 8,681,451 B2 | 3/2014 | Harasawa et al. | |
| 9,105,294 B2 | 8/2015 | Jensen et al. | |
| 9,311,946 B2 | 4/2016 | Tanaka et al. | |
| 9,495,985 B2 | 10/2016 | Xia et al. | |
| 9,530,444 B2 | 12/2016 | Kasada | |
| 9,542,967 B2 | 1/2017 | Sekiguchi et al. | |
| 9,564,161 B1 | 2/2017 | Cherubini et al. | |
| 9,601,146 B2 | 3/2017 | Kasada et al. | |
| 9,704,425 B2 | 7/2017 | Zhang et al. | |
| 9,704,525 B2 | 7/2017 | Kasada | |
| 9,704,527 B2 | 7/2017 | Kasada | |
| 9,711,174 B2 | 7/2017 | Kasada et al. | |
| 9,721,605 B2 | 8/2017 | Oyanagi et al. | |
| 9,721,606 B2 | 8/2017 | Kasada | |
| 9,721,607 B2 | 8/2017 | Tada et al. | |
| 9,748,026 B2 | 8/2017 | Shirata | |
| 9,773,519 B2 | 9/2017 | Kasada et al. | |
| 9,779,772 B1 | 10/2017 | Kasada et al. | |
| 9,837,104 B1 | 12/2017 | Biskeborn | |
| 9,837,116 B2 | 12/2017 | Ozawa et al. | |
| 9,959,894 B2 | 5/2018 | Omura | |
| 9,972,351 B1 | 5/2018 | Kaneko et al. | |
| 9,978,414 B1 | 5/2018 | Kaneko et al. | |
| 9,984,710 B2 * | 5/2018 | Kasada | G11B 5/68 |
| 9,984,712 B1 * | 5/2018 | Ozawa | G11B 5/3909 |
| 9,984,716 B1 | 5/2018 | Kaneko et al. | |
| 10,008,230 B1 | 6/2018 | Ozawa et al. | |
| 10,026,430 B2 | 7/2018 | Kasada et al. | |
| 10,026,433 B2 | 7/2018 | Kasada et al. | |
| 10,026,434 B2 | 7/2018 | Oyanagi et al. | |
| 10,026,435 B2 * | 7/2018 | Kasada | G11B 5/78 |
| 10,062,403 B1 | 8/2018 | Kasada et al. | |
| 10,074,393 B2 | 9/2018 | Kaneko et al. | |
| 10,134,433 B2 | 11/2018 | Kasada et al. | |
| 10,170,144 B2 | 1/2019 | Ozawa et al. | |
| 2001/0038928 A1 | 11/2001 | Nakamigawa et al. | |
| 2001/0053458 A1 | 12/2001 | Suzuki et al. | |
| 2002/0072472 A1 | 7/2002 | Furuya et al. | |
| 2002/0122339 A1 | 9/2002 | Takano et al. | |
| 2003/0059649 A1 | 3/2003 | Saliba et al. | |
| 2003/0091866 A1 | 5/2003 | Ejiri et al. | |
| 2003/0124386 A1 | 7/2003 | Masaki | |
| 2003/0170498 A1 | 9/2003 | Inoue | |
| 2003/0228493 A1 | 12/2003 | Doushita et al. | |
| 2004/0018388 A1 | 1/2004 | Kitamura et al. | |
| 2004/0053074 A1 | 3/2004 | Jingu et al. | |
| 2004/0197605 A1 | 10/2004 | Seki et al. | |
| 2004/0213948 A1 | 10/2004 | Saito et al. | |
| 2004/0218304 A1 | 11/2004 | Goker et al. | |
| 2004/0265643 A1 | 12/2004 | Ejiri | |
| 2005/0057838 A1 | 3/2005 | Ohtsu | |
| 2005/0153170 A1 | 7/2005 | Inoue et al. | |
| 2005/0196645 A1 | 9/2005 | Doi et al. | |
| 2005/0260456 A1 | 11/2005 | Hanai et al. | |
| 2005/0260459 A1 | 11/2005 | Hanai et al. | |
| 2005/0264935 A1 | 12/2005 | Sueki et al. | |
| 2006/0008681 A1 | 1/2006 | Hashimoto et al. | |
| 2006/0035114 A1 | 2/2006 | Kuse et al. | |
| 2006/0056095 A1 | 3/2006 | Saitou | |
| 2006/0068232 A1 | 3/2006 | Mikamo et al. | |
| 2006/0187589 A1 | 8/2006 | Harasawa et al. | |
| 2006/0232883 A1 | 10/2006 | Biskeborn et al. | |
| 2007/0009769 A1 | 1/2007 | Kanazawa | |
| 2007/0020489 A1 | 1/2007 | Yamazaki et al. | |
| 2007/0020490 A1 | 1/2007 | Harasawa et al. | |
| 2007/0224456 A1 | 9/2007 | Murao et al. | |
| 2007/0230054 A1 | 10/2007 | Takeda et al. | |
| 2007/0231606 A1 | 10/2007 | Hanai | |
| 2008/0057351 A1 | 3/2008 | Meguro et al. | |
| 2008/0144211 A1 | 6/2008 | Weber et al. | |
| 2008/0152956 A1 | 6/2008 | Murayama et al. | |
| 2008/0174897 A1 | 7/2008 | Bates et al. | |
| 2008/0297950 A1 | 12/2008 | Noguchi et al. | |
| 2008/0311308 A1 * | 12/2008 | Lee | C08F 2/44 427/496 |
| 2009/0027812 A1 | 1/2009 | Noguchi et al. | |
| 2009/0087689 A1 | 4/2009 | Doushita et al. | |
| 2009/0161249 A1 | 6/2009 | Takayama et al. | |
| 2009/0162701 A1 | 6/2009 | Jensen et al. | |
| 2010/0000966 A1 | 1/2010 | Kamata et al. | |
| 2010/0035086 A1 | 2/2010 | Inoue et al. | |
| 2010/0035088 A1 | 2/2010 | Inoue | |
| 2010/0053810 A1 | 3/2010 | Biskeborn et al. | |
| 2010/0073816 A1 | 3/2010 | Komori et al. | |
| 2010/0081011 A1 * | 4/2010 | Nakamura | G11B 5/735 428/832 |
| 2010/0134929 A1 | 6/2010 | Ito | |
| 2010/0227201 A1 | 9/2010 | Sasaki et al. | |
| 2010/0246073 A1 | 9/2010 | Katayama | |
| 2011/0003241 A1 * | 1/2011 | Kaneko | C08G 73/0206 430/7 |

(56) References Cited

U.S. PATENT DOCUMENTS

| | | |
|---|---|---|
| 2011/0051280 A1 | 3/2011 | Karp et al. |
| 2011/0052908 A1 | 3/2011 | Imaoka |
| 2011/0077902 A1 | 3/2011 | Awezec et al. |
| 2011/0151281 A1 | 6/2011 | Inoue |
| 2011/0244272 A1 | 10/2011 | Suzuki et al. |
| 2012/0045664 A1 | 2/2012 | Tanaka et al. |
| 2012/0177951 A1 | 7/2012 | Yamazaki et al. |
| 2012/0183811 A1 | 7/2012 | Hattori et al. |
| 2012/0196156 A1 | 8/2012 | Suzuki |
| 2012/0243120 A1 | 9/2012 | Harasawa et al. |
| 2012/0244387 A1 | 9/2012 | Mori et al. |
| 2012/0251845 A1 | 10/2012 | Wang et al. |
| 2013/0029183 A1 | 1/2013 | Omura et al. |
| 2013/0084470 A1 | 4/2013 | Hattori et al. |
| 2013/0088794 A1 | 4/2013 | Cherubini et al. |
| 2013/0256584 A1 | 10/2013 | Yamazaki et al. |
| 2013/0260179 A1 | 10/2013 | Kasada et al. |
| 2013/0279040 A1 | 10/2013 | Cideciyan et al. |
| 2013/0286510 A1 | 10/2013 | Rothermel et al. |
| 2014/0011055 A1 | 1/2014 | Suzuki et al. |
| 2014/0130067 A1 | 5/2014 | Madison et al. |
| 2014/0139944 A1 | 5/2014 | Johnson et al. |
| 2014/0272474 A1 | 9/2014 | Kasada |
| 2014/0295214 A1 | 10/2014 | Tada et al. |
| 2014/0342189 A1 | 11/2014 | Tachibana et al. |
| 2014/0366990 A1 | 12/2014 | Lai et al. |
| 2014/0374645 A1 | 12/2014 | Kikuchi et al. |
| 2015/0043101 A1 | 2/2015 | Biskeborn et al. |
| 2015/0098149 A1 | 4/2015 | Bates et al. |
| 2015/0111066 A1 | 4/2015 | Terakawa et al. |
| 2015/0123026 A1 | 5/2015 | Masada et al. |
| 2015/0302879 A1 | 10/2015 | Holmberg et al. |
| 2015/0380036 A1 | 12/2015 | Kasada et al. |
| 2016/0061447 A1 | 3/2016 | Kobayashi |
| 2016/0064025 A1* | 3/2016 | Kurokawa ............... G11B 5/71 428/840.4 |
| 2016/0092315 A1 | 3/2016 | Ashida et al. |
| 2016/0093321 A1 | 3/2016 | Aoshima et al. |
| 2016/0093322 A1 | 3/2016 | Kasada et al. |
| 2016/0093323 A1 | 3/2016 | Omura |
| 2016/0180875 A1 | 6/2016 | Tanaka et al. |
| 2016/0189739 A1 | 6/2016 | Kasada et al. |
| 2016/0189740 A1 | 6/2016 | Oyanagi et al. |
| 2016/0247530 A1 | 8/2016 | Kasada |
| 2016/0260449 A1 | 9/2016 | Ahmad et al. |
| 2016/0276076 A1 | 9/2016 | Kasada |
| 2017/0032812 A1 | 2/2017 | Kasada |
| 2017/0053669 A1 | 2/2017 | Kasada |
| 2017/0053670 A1 | 2/2017 | Oyanagi et al. |
| 2017/0053671 A1 | 2/2017 | Kasada et al. |
| 2017/0058227 A1 | 3/2017 | Kondo et al. |
| 2017/0092315 A1 | 3/2017 | Ozawa et al. |
| 2017/0130156 A1 | 5/2017 | Kondo et al. |
| 2017/0178675 A1 | 6/2017 | Kasada |
| 2017/0178676 A1 | 6/2017 | Kasada |
| 2017/0178677 A1 | 6/2017 | Kasada |
| 2017/0186456 A1 | 6/2017 | Tada et al. |
| 2017/0186460 A1 | 6/2017 | Kasada et al. |
| 2017/0221513 A1 | 8/2017 | Hiroi et al. |
| 2017/0221516 A1 | 8/2017 | Oyanagi et al. |
| 2017/0221517 A1 | 8/2017 | Ozawa et al. |
| 2017/0249963 A1* | 8/2017 | Oyanagi ............... G11B 5/71 |
| 2017/0249964 A1* | 8/2017 | Kasada ............... G11B 5/706 |
| 2017/0249965 A1 | 8/2017 | Kurokawa et al. |
| 2017/0249966 A1 | 8/2017 | Tachibana et al. |
| 2017/0287517 A1 | 10/2017 | Hosoya et al. |
| 2017/0337944 A1 | 11/2017 | Biskeborn et al. |
| 2017/0355022 A1 | 12/2017 | Kaneko et al. |
| 2017/0358318 A1 | 12/2017 | Kasada et al. |
| 2017/0372726 A1 | 12/2017 | Kasada et al. |
| 2017/0372727 A1 | 12/2017 | Kasada et al. |
| 2017/0372736 A1 | 12/2017 | Kaneko et al. |
| 2017/0372737 A1 | 12/2017 | Oyanagi et al. |
| 2017/0372738 A1 | 12/2017 | Kasada |
| 2017/0372739 A1 | 12/2017 | Ozawa et al. |
| 2017/0372740 A1 | 12/2017 | Ozawa et al. |
| 2017/0372741 A1 | 12/2017 | Kurokawa et al. |
| 2017/0372742 A1 | 12/2017 | Kaneko et al. |
| 2017/0372743 A1 | 12/2017 | Kasada et al. |
| 2017/0372744 A1 | 12/2017 | Ozawa et al. |
| 2018/0061446 A1 | 3/2018 | Kasada |
| 2018/0061447 A1* | 3/2018 | Kasada ............... G11B 5/78 |
| 2018/0082710 A1 | 3/2018 | Tada et al. |
| 2018/0137887 A1 | 5/2018 | Sekiguchi et al. |
| 2018/0182417 A1 | 6/2018 | Kaneko et al. |
| 2018/0182422 A1 | 6/2018 | Kawakami et al. |
| 2018/0182425 A1 | 6/2018 | Kasada et al. |
| 2018/0182426 A1* | 6/2018 | Ozawa ............... G11B 5/70 |
| 2018/0182427 A1 | 6/2018 | Kasada et al. |
| 2018/0182428 A1 | 6/2018 | Kasada et al. |
| 2018/0182429 A1 | 6/2018 | Kasada et al. |
| 2018/0182430 A1 | 6/2018 | Ozawa et al. |
| 2018/0240475 A1 | 8/2018 | Kasada |
| 2018/0240476 A1 | 8/2018 | Kasada et al. |
| 2018/0240478 A1 | 8/2018 | Kasada et al. |
| 2018/0240479 A1 | 8/2018 | Kasada et al. |
| 2018/0240481 A1 | 8/2018 | Kasada et al. |
| 2018/0240488 A1* | 8/2018 | Kasada ............... G11B 5/72 |
| 2018/0240489 A1 | 8/2018 | Kasada et al. |
| 2018/0240490 A1* | 8/2018 | Kurokawa ............... G11B 5/70 |
| 2018/0240491 A1 | 8/2018 | Ozawa et al. |
| 2018/0240492 A1* | 8/2018 | Kasada ............... G11B 5/735 |
| 2018/0240493 A1 | 8/2018 | Tada et al. |
| 2018/0240494 A1 | 8/2018 | Kurokawa et al. |
| 2018/0240495 A1 | 8/2018 | Kasada |
| 2018/0286439 A1 | 10/2018 | Ozawa et al. |
| 2018/0286442 A1 | 10/2018 | Ozawa et al. |
| 2018/0286443 A1 | 10/2018 | Ozawa et al. |
| 2018/0286444 A1 | 10/2018 | Kasada et al. |
| 2018/0286446 A1 | 10/2018 | Ozawa et al. |
| 2018/0286447 A1 | 10/2018 | Ozawa et al. |
| 2018/0286448 A1 | 10/2018 | Ozawa et al. |
| 2018/0286449 A1 | 10/2018 | Kasada et al. |
| 2018/0286450 A1 | 10/2018 | Kasada et al. |
| 2018/0286451 A1 | 10/2018 | Ozawa et al. |
| 2018/0286452 A1 | 10/2018 | Ozawa et al. |
| 2018/0286453 A1 | 10/2018 | Kasada et al. |
| 2018/0301165 A1 | 10/2018 | Oyanagi et al. |
| 2018/0350398 A1 | 12/2018 | Kawakami et al. |
| 2018/0350400 A1 | 12/2018 | Kaneko et al. |
| 2018/0358042 A1 | 12/2018 | Kasada et al. |
| 2018/0374507 A1 | 12/2018 | Kasada |
| 2019/0027167 A1 | 1/2019 | Tada et al. |
| 2019/0027168 A1 | 1/2019 | Kasada et al. |
| 2019/0027171 A1 | 1/2019 | Kasada |
| 2019/0027172 A1 | 1/2019 | Kasada |
| 2019/0027174 A1 | 1/2019 | Tada et al. |
| 2019/0027175 A1 | 1/2019 | Kurokawa et al. |
| 2019/0027176 A1* | 1/2019 | Kurokawa ......... G11B 5/70615 |
| 2019/0027177 A1 | 1/2019 | Kasada |
| 2019/0027178 A1 | 1/2019 | Kasada |
| 2019/0027179 A1 | 1/2019 | Ozawa et al. |
| 2019/0027180 A1* | 1/2019 | Kasada ............... G11B 5/735 |
| 2019/0027181 A1 | 1/2019 | Ozawa et al. |
| 2019/0035424 A1 | 1/2019 | Endo |
| 2019/0051325 A1 | 2/2019 | Kasada et al. |
| 2019/0088278 A1 | 3/2019 | Kasada et al. |
| 2019/0096437 A1 | 3/2019 | Ozawa et al. |
| 2019/0103130 A1 | 4/2019 | Kasada et al. |
| 2019/0103131 A1 | 4/2019 | Kasada et al. |
| 2019/0103133 A1 | 4/2019 | Ozawa et al. |
| 2019/0103134 A1 | 4/2019 | Kasada et al. |
| 2019/0103135 A1* | 4/2019 | Ozawa ............... G11B 5/78 |
| 2019/0130936 A1 | 5/2019 | Kaneko et al. |

FOREIGN PATENT DOCUMENTS

| | | |
|---|---|---|
| JP | 6111924 A | 1/1986 |
| JP | 61-139923 A | 6/1986 |
| JP | 61-139932 A | 6/1986 |
| JP | 63-129519 A | 6/1988 |
| JP | 63249932 A | 10/1988 |
| JP | 64-57422 A | 3/1989 |
| JP | 6460819 A | 3/1989 |

(56) References Cited

FOREIGN PATENT DOCUMENTS

| | | | |
|---|---|---|---|
| JP | 5-258283 | A | 10/1993 |
| JP | 5-298653 | A | 11/1993 |
| JP | 7-57242 | A | 3/1995 |
| JP | 11-110743 | A | 4/1999 |
| JP | 11-175949 | A | 7/1999 |
| JP | 11273051 | A | 10/1999 |
| JP | 2000-251240 | A | 9/2000 |
| JP | 2002-157726 | A | 5/2002 |
| JP | 2002-329605 | A | 11/2002 |
| JP | 2002-367142 | A | 12/2002 |
| JP | 2002367318 | A * | 12/2002 |
| JP | 2003-77116 | A | 3/2003 |
| JP | 2003-323710 | A | 11/2003 |
| JP | 2004-005820 | A | 1/2004 |
| JP | 2004-133997 | A | 4/2004 |
| JP | 2004-185676 | A | 7/2004 |
| JP | 2005-38579 | A | 2/2005 |
| JP | 2005-243063 | A | 9/2005 |
| JP | 2005-243162 | A | 9/2005 |
| JP | 2006-92672 | A | 4/2006 |
| JP | 2006-286114 | A | 10/2006 |
| JP | 2007-273039 | A | 10/2007 |
| JP | 2007-287310 | A | 11/2007 |
| JP | 2007-297427 | A | 11/2007 |
| JP | 2008-243317 | A | 10/2008 |
| JP | 2009-283082 | A | 12/2009 |
| JP | 2010-036350 | A | 2/2010 |
| JP | 2010-049731 | A | 3/2010 |
| JP | 2011-48878 | A | 3/2011 |
| JP | 2011-138566 | A | 7/2011 |
| JP | 2011210288 | A | 10/2011 |
| JP | 2011-225417 | A | 11/2011 |
| JP | 2012-38367 | A | 2/2012 |
| JP | 2012-043495 | A | 3/2012 |
| JP | 2012-203955 | A | 10/2012 |
| JP | 2013-25853 | A | 2/2013 |
| JP | 2013-77360 | A | 4/2013 |
| JP | 2013-164889 | A | 8/2013 |
| JP | 2014-15453 | A | 1/2014 |
| JP | 2014-179149 | A | 9/2014 |
| JP | 2015-39801 | A | 3/2015 |
| JP | 2015-111484 | A | 6/2015 |
| JP | 2016-15183 | A | 1/2016 |
| JP | 2016-502224 | A | 1/2016 |
| JP | 2016-051493 | A | 4/2016 |
| JP | 2016-71926 | A | 5/2016 |
| JP | 2016-139451 | A | 8/2016 |

OTHER PUBLICATIONS

Office Action dated Apr. 26, 2017 which issued during the prosecution of U.S. Appl. No. 15/388,864.
Office Action dated Aug. 10, 2017, which issued during the prosecution of U.S. Appl. No. 14/870,618.
Office Action dated Aug. 3, 2018 which issued during the prosecution of U.S. Appl. No. 15/388,911.
Office Action dated Feb. 4, 2016 which issued during the prosecution of U.S. Appl. No. 14/753,227.
Office Action dated Jun. 7, 2018 which issued during the prosecution of U.S. Appl. No. 15/380,309.
Office Action dated May 2, 2018, which issued during the prosecution of U.S. Appl. No. 15/280,195.
Office Action dated May 4, 2018, which issued during the prosecution of U.S. Appl. No. 15/422,944.
Office Action dated May 4, 2018, which issued during the prosecution of U.S. Appl. No. 15/625,428.
Office Action dated May 7, 2018, which issued during the prosecution of U.S. Appl. No. 15/624,792.
"Introduction to TMR Magnetic Sensors", Anonymous, Mar. 12, 2015, MR Sensor Technology, pp. 1-5 (Year: 2015).
Office Action dated May 7, 2018, which issued during the prosecution of U.S. Appl. No. 15/624,897.
Office Action dated May 7, 2018, which issued during the prosecution of U.S. Appl. No. 15/626,832.
Notice of Allowance dated Aug. 30, 2017 which issued during the prosecution of U.S. Appl. No. 15/466,143.
Notice of Allowance dated Apr. 27, 2017 which issued during the prosecution of U.S. Appl. No. 15/052,115.
Notice of Allowance dated Aug. 28, 2018 from the US Patent & Trademark Office in co-pending U.S. Appl. No. 15/422,821.
Office Action dated Nov. 16, 2016 which issued during the prosecution of U.S. Appl. No. 15/072,550.
Office Action dated Oct. 12, 2018, which issued during the prosecution of U.S. Appl. No. 15/626,355.
Office Action dated Oct. 12, 2018, which issued during the prosecution of U.S. Appl. No. 15/627,696.
Office Action dated Oct. 15, 2018, which issued during the prosecution of U.S. Appl. No. 15/619,012.
Office Action dated Oct. 22, 2018, which issued during the prosecution of U.S. Appl. No. 15/854,439.
Office Action dated Oct. 9, 2018, which issued during the prosecution of U.S. Appl. No. 15/628,814.
Office Action dated Sep. 24, 2018, which issued during the prosecution of U.S. Appl. No. 15/690,400.
Office Action dated Sep. 27, 2018, which issued during the prosecution of U.S. Appl. No. 15/690,906.
Office Action dated Sep. 27, 2018, which issued during the prosecution of U.S. Appl. No. 15/854,383.
Office Action dated Aug. 23, 2018 from the United States Patent and Trademark Office in U.S. Appl. No. 15/614,876.
Office Action dated Aug. 23, 2018 from the United States Patent and Trademark Office in U.S. Appl. No. 15/621,464.
Office Action dated Aug. 23, 2018 from the United States Patent and Trademark Office in U.S. Appl. No. 15/626,720.
Office Action dated Aug. 24, 2018 from the United States Patent and Trademark Office in U.S. Appl. No. 15/620,916.
Office Action dated Aug. 3, 2018 from the United States Patent and Trademark Office in U.S. Appl. No. 15/380,336.
Office Action dated Dec. 5, 2016 from the United States Patent and Trademark Office in U.S. Appl. No. 14/978,834.
Office Action dated Dec. 6, 2016 from the United States Patent and Trademark Office in U.S. Appl. No. 14/757,555.
Office Action dated Jun. 9, 2017 which issued during the prosecution of U.S. Appl. No. 15/388,864.
Office Action dated May 30, 2018 which issued during the prosecution of U.S. Appl. No. 15/388,911.
Office Action dated Nov. 18, 2016 which issued during the prosecution of U.S. Appl. No. 14/753,227.
Office Action dated Aug. 15, 2016 which issued during the prosecution of U.S. Appl. No. 14/753,227.
Notice of Allowance dated Apr. 25, 2017 which issued during the prosecution of U.S. Appl. No. 15/072,550.
Notice of Allowance dated Jul. 12, 2017 which issued during the prosecution of U.S. Appl. No. 15/388,864.
Notice of Allowance dated Jul. 13, 2018 which issued during the prosecution of U.S. Appl. No. 15/920,782.
Notice of Allowance dated Jun. 2, 2017 which issued during the prosecution of U.S. Appl. No. 15/218,190.
Notice of Allowance dated Jun. 28, 2017 which issued during the prosecution of U.S. Appl. No. 15/464,991.
Notice of Allowance dated Mar. 14, 2018 which issued during the prosecution of U.S. Appl. No. 15/854,474.
Notice of Allowance dated Mar. 16, 2018 which issued during the prosecution of U.S. Appl. No. 15/854,410.
Notice of Allowance dated Mar. 19, 2018 which issued during the prosecution of U.S. Appl. No. 15/378,907.
Notice of Allowance dated Mar. 21, 2018 which issued during the prosecution of U.S. Appl. No. 15/241,286.
Notice of Allowance dated Mar. 21, 2018 which issued during the prosecution of U.S. Appl. No. 15/241,297.
Notice of Allowance dated Mar. 27, 2018 which issued during the prosecution of U.S. Appl. No. 15/241,631.
Notice of Allowance dated May 10, 2018 which issued during the prosecution of U.S. Appl. No. 15/615,871.

(56) References Cited

OTHER PUBLICATIONS

Notice of Allowance dated May 8, 2017, which issued during the prosecution of U.S. Appl. No. 14/757,555.
Notice of Allowance dated May 8, 2017, which issued during the prosecution of U.S. Appl. No. 14/978,834.
Notice of Allowance dated Oct. 11, 2018, which issued during the prosecution of U.S. Appl. No. 15/380,336.
Notice of Allowance dated Oct. 11, 2018, which issued during the prosecution of U.S. Appl. No. 15/422,944.
Notice of Allowance dated Oct. 11, 2018, which issued during the prosecution of U.S. Appl. No. 15/624,792.
Notice of Allowance dated Oct. 11, 2018, which issued during the prosecution of U.S. Appl. No. 15/624,897.
Notice of Allowance dated Oct. 12, 2018, which issued during the prosecution of U.S. Appl. No. 15/626,832.
Notice of Allowance dated Oct. 6, 2016, which issued during the prosecution of U.S. Appl. No. 14/209,065.
Notice of Allowance dated Sep. 24, 2018, which issued during the prosecution of U.S. Appl. No. 15/854,438.
Notice of Allowance dated Sep. 4, 2018, which issued during the prosecution of U.S. Appl. No. 15/625,428.
Notice of Allowance dated Aug. 27, 2018 in U.S. Appl. No. 15/920,635.
Notice of Allowance dated Jan. 10, 2019 in U.S. Appl. No. 15/848,173.
Notice of Allowance dated Jan. 17, 2019 in U.S. Appl. No. 15/422,944.
Notice of Allowance dated Jan. 17, 2019 in U.S. Appl. No. 15/626,720.
Notice of Allowance dated Jan. 30, 2019 in U.S. Appl. No. 15/854,409.
Notice of Allowance dated Mar. 5, 2019 in U.S. Appl. No. 16/009,603.
Office Action dated Apr. 19, 2018, which issued during the prosecution of U.S. Appl. No. 15/854,438.
Office Action dated Dec. 14, 2018, which issued during the prosecution of U.S. Appl. No. 15/920,517.
Office Action dated Dec. 17, 2018, which issued during the prosecution of U.S. Appl. No. 15/920,515.
Office Action dated Dec. 17, 2018, which issued during the prosecution of U.S. Appl. No. 15/920,533.
Office Action dated Dec. 17, 2018, which issued during the prosecution of U.S. Appl. No. 15/920,538.
Office Action dated Dec. 17, 2018, which issued during the prosecution of U.S. Appl. No. 15/920,544.
Office Action dated Dec. 20, 2018, which issued during the prosecution of U.S. Appl. No. 15/900,164.
Office Action dated Dec. 21, 2018, which issued during the prosecution of U.S. Appl. No. 15/900,230.
Office Action dated Feb. 25, 2016, which issued during the prosecution of U.S. Appl. No. 14/867,752.
Office Action dated Jan. 27, 2015 from the Japanese Patent Office in Japanese Application No. 2013-053543.
Office Action dated Jan. 31, 2018, which issued during the prosecution of U.S. Appl. No. 14/867,752.
Office Action dated Jul. 3, 2018, which issued during the prosecution of U.S. Appl. No. 15/920,518.
Office Action dated Jul. 6, 2015, which issued during the prosecution of U.S. Appl. No. 14/209,065.
Office Action dated Jul. 6, 2018 from the United States Patent and Trademark Office in U.S. Appl. No. 15/848,173.
Office Action dated Mar. 13, 2015, which issued during the prosecution of U.S. Appl. No. 14/209,065.
Office Action dated Mar. 16, 2017, which issued during the prosecution of U.S. Appl. No. 14/867,752.
Office Action dated Mar. 24, 2016, which issued during the prosecution of U.S. Appl. No. 14/209,065.
Office Action dated May 4, 2018 which issued during the prosecution of U.S. Appl. No. 15/422,821.
Office Action dated Nov. 28, 2018, which issued during the prosecution of U.S. Appl. No. 15/899,587.
Office Action dated Nov. 28, 2018, which issued during the prosecution of U.S. Appl. No. 15/900,080.
Office Action dated Nov. 28, 2018, which issued during the prosecution of U.S. Appl. No. 15/900,144.
Office Action dated Nov. 29, 2018, which issued during the prosecution of U.S. Appl. No. 15/380,309.
Office Action dated Nov. 29, 2018, which issued during the prosecution of U.S. Appl. No. 15/422,821.
Office Action dated Nov. 8, 2016 from the Japanese Patent Office in Japanese Application No. 2014-199022.
Office Action dated Oct. 15, 2018, which issued during the prosecution of U.S. Appl. No. 15/854,403.
Office Action dated Oct. 19, 2016, which issued during the prosecution of U.S. Appl. No. 14/867,752.
Office Action dated Oct. 3, 2018 from the United States Patent and Trademark Office in U.S. Appl. No. 15/280,195.
Office Action dated Oct. 5, 2017, which issued during the prosecution of U.S. Appl. No. 15/241,286.
Office Action dated Oct. 5, 2017, which issued during the prosecution of U.S. Appl. No. 15/241,297.
Office Action dated Oct. 5, 2017, which issued during the prosecution of U.S. Appl. No. 15/241,631.
Office Action dated Oct. 5, 2017, which issued during the prosecution of U.S. Appl. No. 15/378,907.
Office Action dated Sep. 10, 2015, which issued during the prosecution of U.S. Appl. No. 14/209,065.
Office Action dated Sep. 19, 2014, which issued during the prosecution of U.S. Appl. No. 14/209,065.
Office Action dated Sep. 26, 2017 issued by the Japanese Patent Office in JP Appln. No. 2014-265723.
Office Action dated Sep. 26, 2017 issued by the Japanese Patent Office in JP Appln. No. 2015-249264.
Office Action dated Sep. 28, 2018, which issued during the prosecution of U.S. Appl. No. 15/854,409.
Office Action dated Sep. 7, 2017, which issued during the prosecution of U.S. Appl. No. 14/867,752.
Office Action dated Dec. 19, 2018 in U.S. Appl. No. 15/900,345.
Office Action dated Dec. 19, 2018 in U.S. Appl. No. 15/900,379.
Office Action dated Dec. 20, 2018 in U.S. Appl. No. 15/900,106.
Office Action dated Dec. 20, 2018 in U.S. Appl. No. 15/900,242.
Office Action dated Dec. 21, 2018 in U.S. Appl. No. 15/900,160.
Office Action dated Dec. 21, 2018 in U.S. Appl. No. 15/920,616.
Office Action dated Dec. 25, 2018 in Japanese Application No. 2015-245144.
Office Action dated Dec. 25, 2018 in Japanese Application No. 2015-245145.
Office Action dated Dec. 25, 2018 in Japanese Application No. 2015-254192.
Office Action dated Dec. 27, 2018 in U.S. Appl. No. 15/900,334.
Office Action dated Dec. 31, 2018 in U.S. Appl. No. 16/009,603.
Office Action dated Dec. 7, 2018 in U.S. Appl. No. 15/920,592.
Office Action dated Feb. 21, 2019 in U.S. Appl. No. 15/854,383.
Office Action dated Feb. 26, 2019 in Japanese Application No. 2016-123207.
Office Action dated Feb. 26, 2019 in U.S. Appl. No. 15/380,336.
Office Action dated Feb. 26, 2019 in U.S. Appl. No. 15/624,792.
Office Action dated Feb. 26, 2019 in U.S. Appl. No. 15/624,897.
Office Action dated Feb. 26, 2019 in U.S. Appl. No. 15/626,832.
Office Action dated Feb. 5, 2019 in Japanese Application No. 2016-117339.
Office Action dated Feb. 5, 2019 in Japanese Application No. 2016-123205.
Office Action dated Feb. 5, 2019 in Japanese Application No. 2016-169871.
Office Action dated Feb. 7, 2019 in U.S. Appl. No. 15/621,464.
Office Action dated Jan. 10, 2019 in U.S. Appl. No. 15/899,430.
Office Action dated Jan. 29, 2019 in U.S. Appl. No. 15/614,876.
Office Action dated Jan. 30, 2019 in U.S. Appl. No. 15/620,916.
Office Action dated Mar. 5, 2019 in U.S. Appl. No. 15/443,026.
Office Action dated Mar. 6, 2019 in U.S. Appl. No. 15/854,403.
Office Action dated Nov. 14, 2018 in U.S. Appl. No. 16/100,289.
Office Action dated Nov. 19, 2018 in U.S. Appl. No. 15/900,141.
Notice of Allowance dated Feb. 14, 2018, which issued during the prosecution of U.S. Appl. No. 14/870,618.
Notice of Allowance dated Dec. 2, 2016 which issued during the prosecution of U.S. Appl. No. 14/753,227.

(56) References Cited

OTHER PUBLICATIONS

Notice of Allowance dated Apr. 5, 2018, which issued during the prosecution of U.S. Appl. No. 14/867,752.
Notice of Allowance dated Aug. 9, 2018, which issued during the prosecution of U.S. Appl. No. 15/920,563.
Notice of Allowance dated Dec. 4, 2018, which issued during the prosecution of U.S. Appl. No. 15/625,428.
Notice of Allowance dated Aug. 6, 2018, which issued during the prosecution of U.S. Appl. No. 15/920,768.
Notice of Allowance dated Dec. 3, 2018, which issued during the prosecution of U.S. Appl. No. 15/920,518.
Office Action dated Feb. 28, 2019 in U.S. Appl. No. 15/920,518.
Notice of Allowance dated Apr. 16, 2019 in U.S. Appl. No. 15/625,428.
Notice of Allowance dated Apr. 30, 2019 in U.S. Appl. No. 15/380,309.
Notice of Allowance dated Mar. 13, 2019 in U.S. Appl. No. 16/100,289.
Notice of Allowance dated Mar. 18, 2019 in U.S. Appl. No. 15/626,355.
Notice of Allowance dated Mar. 18, 2019 in U.S. Appl. No. 15/628,814.
Office Action dated Apr. 15, 2019 in U.S. Appl. No. 16/182,083.
Office Action dated Apr. 16, 2019 in U.S. Appl. No. 16/232,165.
Office Action dated Apr. 23, 2019 in Japanese Application No. 2016-169851.
Office Action dated Apr. 23, 2019 in Japanese Application No. 2016-182230.
Office Action dated Feb. 5, 2019 in U.S. Appl. No. 16/038,339.
Office Action dated Mar. 15, 2019 in U.S. Appl. No. 15/280,195.
Office Action dated Mar. 15, 2019 in U.S. Appl. No. 15/619,012.
Office Action dated Mar. 15, 2019 in U.S. Appl. No. 15/627,696.
Office Action dated Mar. 15, 2019 in U.S. Appl. No. 15/690,906.
Office Action dated Mar. 18, 2019 in U.S. Appl. No. 15/442,961.
Office Action dated Mar. 19, 2019 in Japanese Application No. 2016-116261.
Office Action dated Mar. 19, 2019 in Japanese Application No. 2016-124515.
Office Action dated Mar. 19, 2019 in Japanese Application No. 2016-124529.
Office Action dated Mar. 19, 2019 in Japanese Application No. 2016-124932.
Office Action dated Mar. 19, 2019 in Japanese Application No. 2016-124933.
Office Action dated Mar. 19, 2019 in Japanese Application No. 2016-124935.
Office Action dated Mar. 19, 2019 in U.S. Appl. No. 15/443,094.
Office Action dated Mar. 21, 2019 in U.S. Appl. No. 15/900,144.
Office Action dated Mar. 21, 2019 in U.S. Appl. No. 16/160,377.
Office Action dated Mar. 27, 2019 in U.S. Appl. No. 15/690,400.
Office Action dated Mar. 7, 2019 in U.S. Appl. No. 15/854,439.
Office Action dated Apr. 4, 2019 in U.S. Appl. No. 16/184,312.
Notice of Allowance dated Jun. 6, 2019 in U.S. Appl. No. 15/854,383.
Notice of Allowance dated May 13, 2019 in U.S. Appl. No. 15/900,379.
Notice of Allowance dated May 14, 2019 in U.S. Appl. No. 15/422,821.
Notice of Allowance dated May 14, 2019 in U.S. Appl. No. 15/900,164.
Notice of Allowance dated May 15, 2019 in U.S. Appl. No. 15/900,106.
Notice of Allowance dated May 16, 2019 in U.S. Appl. No. 15/614,876.
Notice of Allowance dated May 16, 2019 in U.S. Appl. No. 15/621,464.
Notice of Allowance dated May 24, 2019 in U.S. Appl. No. 15/900,345.
Notice of Allowance dated May 24, 2019 in U.S. Appl. No. 16/143,646.
Notice of Allowance dated May 28, 2019 in U.S. Appl. No. 15/920,616.
Notice of Allowance dated May 29, 2019 in U.S. Appl. No. 15/900,160.
Notice of Allowance dated May 29, 2019 in U.S. Appl. No. 15/900,334.
Notice of Allowance dated May 30, 2019 in U.S. Appl. No. 15/900,230.
Office Action dated Jun. 10, 2019 in U.S. Appl. No. 15/920,518.
Office Action dated Jun. 6, 2019 in U.S. Appl. No. 15/899,587.
Office Action dated May 23, 2019 in U.S. Appl. No. 15/388,911.
Notice of Allowance dated Jun. 25, 2019 in U.S. Appl. No. 15/620,916.
Office Action dated Jun. 25, 2019 in Japanese Application No. 2015-245144.
Notice of Allowance dated Jun. 27, 2019 in U.S. Appl. No. 15/854,439.
Notice of Allowance dated Jul. 16, 2019 in U.S. Appl. No. 15/900,144.
Notice of Allowance dated Jul. 31, 2019 in U.S. Appl. No. 16/100,289.
Notice of Allowance dated Jul. 31, 2019 in U.S. Appl. No. 16/143,646.
Office Action dated Aug. 6, 2019 in Japanese Application No. 2016-254421.
Office Action dated Aug. 6, 2019 in Japanese Application No. 2016-254427.
Office Action dated Jul. 16, 2019 in Japanese Application No. 2016-124933.

* cited by examiner

MAGNETIC TAPE HAVING CHARACTERIZED BACK COATING AND MAGNETIC LAYERS

CROSS-REFERENCE TO RELATED APPLICATIONS

This application claims priority under 35 U.S.C 119 to Japanese Patent Application No. 2017-029507 filed on Feb. 20, 2017. The above application is hereby expressly incorporated by reference, in its entirety, into the present application.

BACKGROUND OF THE INVENTION

1. Field of the Invention

The present invention relates to a magnetic tape.

2. Description of the Related Art

Magnetic recording media are divided into tape-shaped magnetic recording media and disk-shaped magnetic recording media, and tape-shaped magnetic recording media, that is, magnetic tapes are mainly used for storage such as data back-up. The recording and reproducing of a signal to the magnetic tape are normally performed by allowing the magnetic tape to run in a drive and bringing the surface of the magnetic layer of the magnetic tape to come into contact with a magnetic head (hereinafter, also simply referred to as a "head") to slide thereon.

In the field of magnetic recording, the improvement of electromagnetic conversion characteristics is constantly required. In regards to this point, JP2010-49731A, for example, discloses that a magnetic recording medium having excellent electromagnetic conversion characteristics is obtained by increasing surface smoothness of a magnetic layer (for example, see paragraphs 0020 and 0178 of JP2010-49731A).

SUMMARY OF THE INVENTION

Increasing surface smoothness of a surface of a magnetic layer of a magnetic tape is an effective method for narrowing an interval (spacing) between a surface of a magnetic layer of a magnetic tape and a head to improve electromagnetic conversion characteristics.

However, in such studies of the inventors, it was clear that a decrease in reproduction output is observed while repeating the running in the magnetic tape in which surface smoothness of the magnetic layer is increased for improving electromagnetic conversion characteristics.

Therefore, an object of the invention is to provide a magnetic tape which shows excellent electromagnetic conversion characteristics and in which a decrease in reproduction output during repeated running is prevented.

According to one aspect of the invention, there is provided a magnetic tape comprising: a non-magnetic support; a magnetic layer including ferromagnetic powder and a binding agent on one surface side of the non-magnetic support; and a back coating layer including non-magnetic powder and a binding agent on the other surface side of the non-magnetic support, in which a center line average surface roughness Ra measured regarding a surface of the magnetic layer is equal to or smaller than 1.8 nm, a contact angle with respect to 1-bromonaphthalene measured regarding the surface of the magnetic layer is 45.0° to 55.0°, and a logarithmic decrement acquired by a pendulum viscoelasticity test performed regarding the surface of the back coating layer is equal to or smaller than 0.060.

In the invention and the specification, the center line average surface roughness Ra measured regarding the surface of the magnetic layer of the magnetic tape (hereinafter, also simply referred to as a "magnetic layer surface roughness Ra") is a value measured with an atomic force microscope (AFM) in a region, of the surface of the magnetic layer, having an area of 40 µm×40 µm. As an example of the measurement conditions, the following measurement conditions can be used. The magnetic layer surface roughness Ra shown in examples which will be described later is a value obtained by the measurement under the following measurement conditions. In addition, the "surface of the magnetic layer" of the magnetic tape is identical to the surface of the magnetic tape on the magnetic layer side. The "surface of the back coating layer" of the magnetic tape is identical to the surface of the magnetic tape on the back coating layer side.

The measurement is performed regarding the region of 40 µm×40 µm of the area of the surface of the magnetic layer of the magnetic tape with an AFM (Nanoscope 4 manufactured by Veeco Instruments, Inc.) in a tapping mode. RTESP-300 manufactured by BRUKER is used as a probe, a scan speed (probe movement speed) is set as 40 µm/sec, and a resolution is set as 512 pixel×512 pixel.

Hereinafter, the contact angle with respect to 1-bromonaphthalene measured regarding the surface of the magnetic layer is also referred to as a "1-bromonaphthalene contact angle of the magnetic layer" or simply as a "1-bromonaphthalene contact angle". The 1-bromonaphthalene contact angle is a value measured by a liquid droplet method. Specifically, the 1-bromonaphthalene contact angle is an arithmetical mean of values obtained by performing measurement regarding a certain sample six times by a θ/2 method in a measurement environment of an atmosphere temperature of 25° C. and a relative humidity of 25%. An example of a specific aspect of measurement conditions will be described later in examples.

Hereinafter, the logarithmic decrement acquired by a pendulum viscoelasticity test performed regarding the surface of the back coating layer is also referred to as a "logarithmic decrement of the back coating layer" or simply as a "logarithmic decrement".

In the invention and the specification, the logarithmic decrement described above is a value acquired by the following method.

FIGS. 1 to 3 are explanatory diagrams of a measurement method of the logarithmic decrement. Hereinafter, the measurement method of the logarithmic decrement will be described with reference to the drawings. However, the aspect shown in the drawing is merely an example and the invention is not limited thereto.

A measurement sample 100 is cut out from the magnetic tape which is a measurement target. The cut-out measurement sample 100 is placed on a substrate 103 so that a measurement surface (surface of the back coating layer) faces upwards, in a sample stage 101 in a pendulum viscoelasticity tester, and the measurement sample is fixed by fixing tapes 105 in a state where obvious wrinkles which can be visually confirmed are not generated.

A pendulum-attached columnar cylinder edge 104 (diameter of 4 mm) having mass of 13 g is loaded on the measurement surface of the measurement sample 100 so that a long axis direction of the cylinder edge becomes parallel to a longitudinal direction of the measurement sample 100.

An example of a state in which the pendulum-attached columnar cylinder edge 104 is loaded on the measurement surface of the measurement sample 100 as described above (state seen from the top) is shown in FIG. 1. In the aspect shown in FIG. 1, a holder and temperature sensor 102 is installed and a temperature of the surface of the substrate 103 can be monitored. However, this configuration is not essential. In the aspect shown in FIG. 1, the longitudinal direction of the measurement sample 100 is a direction shown with an arrow in the drawing, and is a longitudinal direction of a magnetic tape from which the measurement sample is cut out. In the invention and the specification, the description regarding "parallel" includes a range of errors allowed in the technical field of the invention. For example, the range of errors means a range within ±10° from an exact parallel state, and the error from the exact parallel state is preferably within ±5° and more preferably within ±3. In addition, as a pendulum 107 (see FIG. 2), a pendulum formed of a material having properties of being adsorbed to a magnet (for example, formed of metal or formed of an alloy) is used.

The temperature of the surface of the substrate 103 on which the measurement sample 100 is placed is set to 80° C. by increasing the temperature at a rate of temperature increase equal to or lower than 5° C./min (arbitrary rate of temperature increase may be set, as long as it is equal to or lower than 5° C./min), and the pendulum movement is started (induce initial vibration) by releasing adsorption between the pendulum 107 and a magnet 106. An example of a state of the pendulum 107 which performs the pendulum movement (state seen from the side) is shown in FIG. 2. In the aspect shown in FIG. 2, in the pendulum viscoelasticity tester, the pendulum movement is started by stopping (switching off) the electricity to the magnet (electromagnet) 106 disposed on the lower side of the sample stage to release the adsorption, and the pendulum movement is stopped by restarting (switching on) the electricity to the electromagnet to cause the pendulum 107 to be adsorbed to the magnetic 106. As shown in FIG. 2, during the pendulum movement, the pendulum 107 reciprocates the amplitude. From a result obtained by monitoring displacement of the pendulum with a displacement sensor 108 while the pendulum reciprocates the amplitude, a displacement-time curve in which a vertical axis indicates the displacement and a horizontal axis indicates the elapsed time is obtained. An example of the displacement-time curve is shown in FIG. 3. FIG. 3 schematically shows correspondence between the state of the pendulum 107 and the displacement-time curve. The stop (adsorption) and the pendulum movement are repeated at a regular measurement interval, the logarithmic decrement Δ (no unit) is acquired from the following Expression by using a displacement-time curve obtained in the measurement interval after 10 minutes or longer (may be arbitrary time, as long as it is 10 minutes or longer) has elapsed, and this value is set as logarithmic decrement of the surface of the back coating layer of the magnetic tape. The adsorption time of the first adsorption is set as 1 second or longer (may be arbitrary time, as long as it is 1 second or longer), and the interval between the adsorption stop and the adsorption start is set as 6 seconds or longer (may be arbitrary time, as long as it is 6 seconds or longer). The measurement interval is an interval of the time from the adsorption start and the next adsorption start. In addition, humidity of an environment in which the pendulum movement is performed, may be arbitrary relative humidity, as long as the relative humidity is 40% to 70%.

$$\Delta = \frac{\ln\left(\frac{A_1}{A_2}\right) + \ln\left(\frac{A_2}{A_3}\right) + \ldots \ln\left(\frac{A_n}{A_{n+1}}\right)}{n}$$

In the displacement-time curve, an interval between a point of the minimum displacement and a point of the next minimum displacement is set as a period of a wave. n indicates the number of waves included in the displacement-time curve in the measurement interval, and An indicates the minimum displacement and maximum displacement of the n-th wave. In FIG. 3, an interval between the minimum displacement of the n-th wave and the next minimum displacement is shown as Pn (for example, $P_1$ regarding the first wave, $P_2$ regarding the second wave, and $P_3$ regarding the third wave). In the calculation of the logarithmic decrement, a difference (in Expression $A_{n+1}$, in the displacement-time curve shown in FIG. 3, $A_4$) between the minimum displacement and the maximum displacement appearing after the n-th wave is also used, but a part where the pendulum 107 stops (adsorption) after the maximum displacement is not used in the counting of the number of waves. In addition, a part where the pendulum 107 stops (adsorption) before the maximum displacement is not used in the counting of the number of waves, either. Accordingly, the number of waves is 3 (n=3) in the displacement-time curve shown in FIG. 3.

In one aspect, the logarithmic decrement is 0.010 to 0.060.

In one aspect, the center line average surface roughness Ra is 1.2 nm to 1.8 nm.

In one aspect, the contact angle with respect to the 1-bromonaphthalene measured regarding the surface of the magnetic layer is 45.0° to 53.5°.

In one aspect, the magnetic layer includes a nitrogen-containing polymer.

In one aspect, the magnetic layer includes one or more lubricants selected from the group consisting of fatty acid, fatty acid ester, and fatty acid amide.

In one aspect, the magnetic tape further comprises a non-magnetic layer including non-magnetic powder and a binding agent between the non-magnetic support and the magnetic layer.

In the magnetic tape according to one aspect of the invention, it is possible to exhibit excellent electromagnetic conversion characteristics and prevent a decrease in reproduction output during repeated running.

DESCRIPTION OF THE PREFERRED EMBODIMENTS

Figure 1:
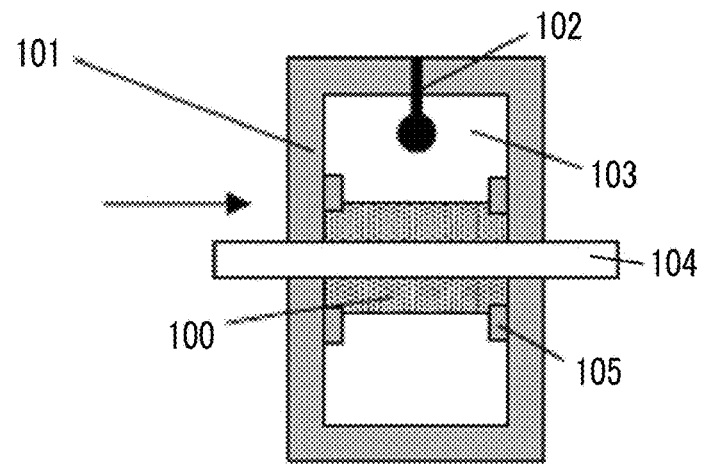
FIG. 1 is an explanatory diagram of a measurement method of a logarithmic decrement.
Figure 2:
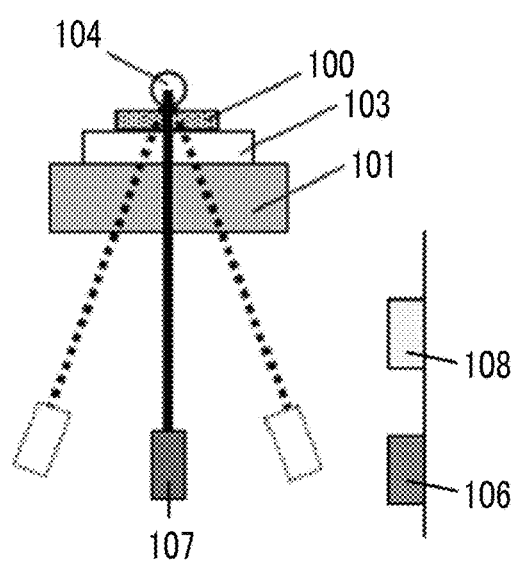
FIG. 2 is an explanatory diagram of the measurement method of a logarithmic decrement.
Figure 3:
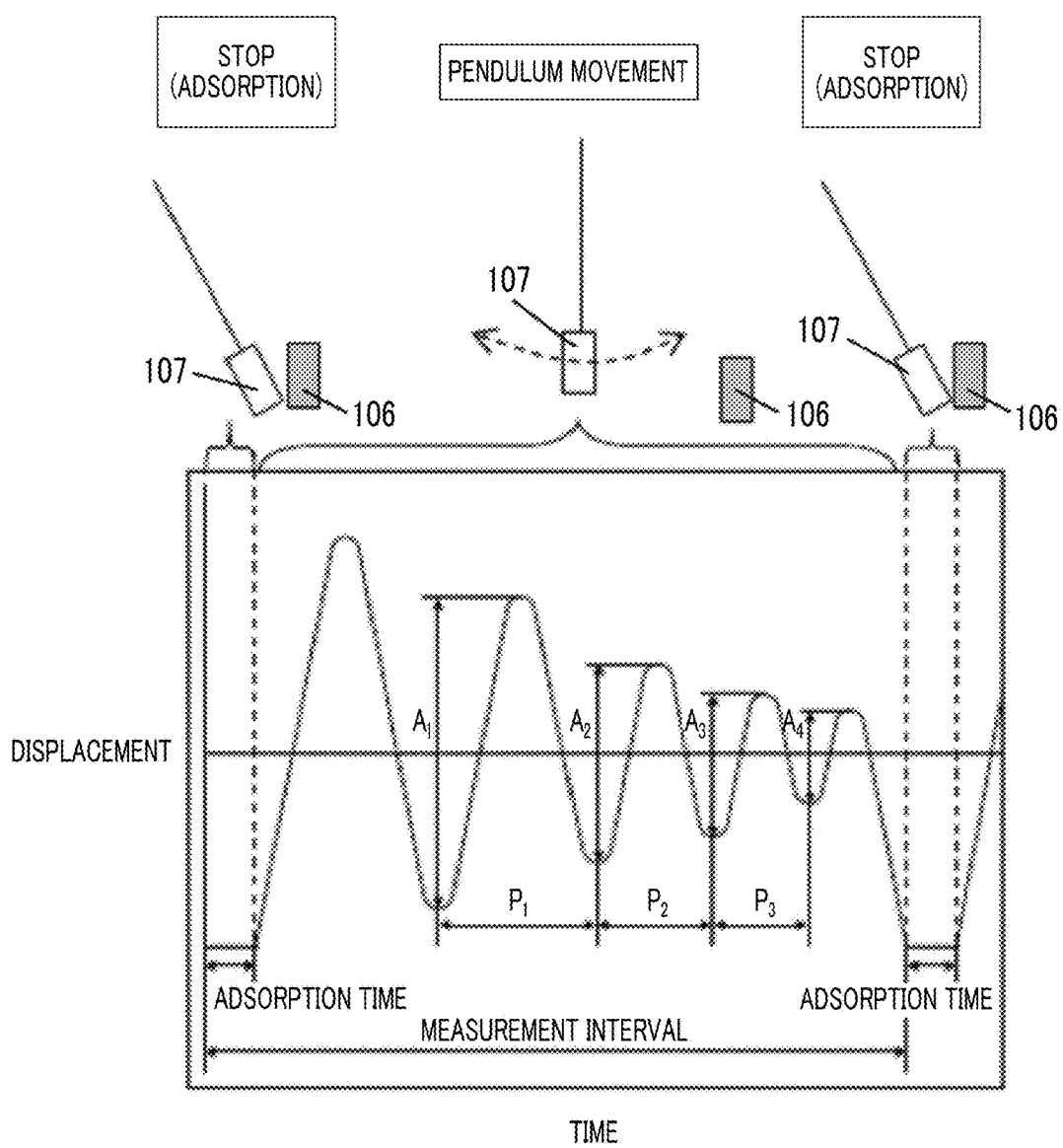
FIG. 3 is an explanatory diagram of the measurement method of a logarithmic decrement.

One aspect of the invention relates to a magnetic tape including: a non-magnetic support; a magnetic layer including ferromagnetic powder and a binding agent on one surface side of the non-magnetic support; and a back coating layer including non-magnetic powder and a binding agent on the other surface side of the non-magnetic support, in which a center line average surface roughness Ra measured regarding the surface of the magnetic layer (magnetic layer surface roughness Ra) is equal to or smaller than 1.8 nm, a contact angle with respect to 1-bromonaphthalene measured regarding a surface of the magnetic layer (1-bromonaphthalene contact angle of the magnetic layer) is 45.0° to 55.0°, and a logarithmic decrement acquired by a pendulum viscoelasticity test performed regarding the surface of the back coating layer (logarithmic decrement of the back coating layer) is equal to or smaller than 0.060.

Hereinafter, the magnetic tape will be described more specifically.

Magnetic Layer Surface Roughness Ra

The center line average surface roughness Ra measured regarding the surface of the magnetic layer of the magnetic tape is equal to or smaller than 1.8 nm. Accordingly, the magnetic tape can exhibit excellent electromagnetic conversion characteristics. From a viewpoint of further improving the electromagnetic conversion characteristics, the magnetic layer surface roughness Ra is preferably equal to or smaller than 1.7 nm and even more preferably equal to or smaller than 1.6 nm. In addition, the magnetic layer surface roughness Ra can be equal to or greater than 1.0 nm or equal to or greater than 1.2 nm. However, from a viewpoint of improving the electromagnetic conversion characteristics, low magnetic layer surface roughness Ra is preferable, and thus, the magnetic layer surface roughness Ra may be lower than the exemplified lower limit.

The magnetic layer surface roughness Ra can be controlled by a well-known method. For example, the magnetic layer surface roughness Ra can be changed in accordance with the size of various powders included in the magnetic layer or manufacturing conditions of the magnetic tape. Thus, by adjusting one or more of these, it is possible to obtain a magnetic tape having the magnetic layer surface roughness Ra equal to or smaller than 1.8 nm.

The inventors have found that, in the magnetic tape having the magnetic layer surface roughness Ra equal to or smaller than 1.8 nm, in a case where any measures are not prepared, the reproduction output is decreased while repeating running. Although the reason of a decrease in reproduction output is not clear, it is found that the decrease in reproduction output significantly occurs in a case of repeated running of the magnetic tape at a high speed in an environment of a high temperature and high humidity. The environment of a high temperature and high humidity here is, for example, an environment in which an atmosphere temperature is 30° C. to 45° C. and relative humidity is equal to or higher than 65% (for example, 65% to 90%). The running at a high speed is, for example, running of the magnetic tape at a running speed equal to or higher than 6.0 m/sec.

Therefore, as a result of intensive studies of the inventors, the inventors have newly found that it is possible to prevent a decrease in reproduction output during repeated running at a high speed in the environment of a high temperature and high humidity, by respectively setting the logarithmic decrement and the 1-bromonaphthalene contact angle as described above, in the magnetic tape having the magnetic layer surface roughness Ra equal to or smaller than 1.8 nm. Details of this point will be described later.

It is thought that the decrease in reproduction output occurs because, in a case where cut scraps are generated due to chipping of the surface of the magnetic layer at the time of sliding of the surface of the magnetic layer and the head in a case of repeated running of the magnetic tape, the cut scraps are attached to the head, become head attached materials, and are interposed between the surface of the magnetic layer and the head (so-called spacing loss). Thus, the inventors have made research for decreasing the amount of the head attached materials. As a result, the inventors have considered that the logarithmic decrement of the back coating layer and the 1-bromonaphthalene contact angle of the magnetic layer set as described above contribute to promoting of smooth sliding between the surface of the magnetic layer and the head (improvement of sliding properties), and as a result, it is possible to prevent generation of cut scraps due to the chipping of the surface of the magnetic layer due to the sliding on the head. More specifically, the inventors have surmised that the logarithmic decrement of the back coating layer and the 1-bromonaphthalene contact angle of the magnetic layer set as described above contribute to a decrease in amount of liquid components which are present on the surface of the magnetic layer and causing a decrease in sliding properties. The logarithmic decrement of the back coating layer and the 1-bromonaphthalene contact angle of the magnetic layer will be described later specifically. By doing so, the magnetic tape according to one aspect of the invention has been completed. However, the above and following descriptions include the surmise of the inventors. The invention is not limited to such a surmise.

Logarithmic Decrement of Back Coating Layer

The logarithmic decrement acquired by a pendulum viscoelasticity test performed regarding the surface of the back coating layer of the magnetic tape is equal to or smaller than 0.060. This can contribute to prevention of a decrease in reproduction output, in a case of the repeated running of the magnetic tape having the magnetic layer surface roughness Ra in the range described above. From a viewpoint of further preventing a decrease in reproduction output, the logarithmic decrement is preferably equal to or smaller than 0.058, more preferably equal to or smaller than 0.055, even more preferably equal to or smaller than 0.050, still preferably equal to or smaller than 0.045, still more preferably equal to or smaller than 0.040, and still even more preferably equal to or smaller than 0.035. In addition, the logarithmic decrement can be, for example, equal to or greater than 0.010 or equal to or greater than 0.012. From a viewpoint of preventing a decrease in reproduction output, the logarithmic decrement tends to be preferable, as it is low. Therefore, the logarithmic decrement may be lower than the lower limit exemplified above.

The inventors have considered regarding the logarithmic decrement described above as follows. However, the below description is merely a surmise and the invention is not limited thereto.

It is possible to improve electromagnetic conversion characteristics by increasing the surface smoothness of the surface of the magnetic layer of the magnetic tape. Meanwhile, it is thought that, in a case where the surface smoothness is increased, a contact area (so-called real contact area) between the surface of the magnetic layer and the head during repeated running increases. Accordingly, the inventors have surmised that, in a case where any measures are not prepared, a coefficient of friction at the time of sliding of the surface of the magnetic layer and the head increases, and smooth sliding of the surface of the magnetic layer and the head tends to be hardly realized (sliding properties are deteriorated). Meanwhile, it is thought that the sliding properties of the surface of the magnetic layer and the head can be improved by decreasing the amount of liquid components present on the surface of the magnetic layer. Accordingly, the inventors have thought that, in a case where the amount of liquid components present on the surface of the magnetic layer is decreased, it is possible to prevent a deterioration in sliding properties of the surface of the magnetic layer and the head, in the magnetic tape having high surface smoothness of the magnetic layer. It is surmised that the liquid components may include moisture and the like adsorbed to the surface of the magnetic layer from the atmosphere, for example. However, this is merely a surmise. The inventors have thought that the logarithmic decrement of the back coating layer equal to or smaller than 0.060 contributes to a decrease in the amount of liquid components present on the surface of the magnetic layer, because the liquid components present on the surface of the magnetic layer easily move to the surface of the back coating layer, in a case where the magnetic tape is wound and the surface of the magnetic layer and the surface of the back coating layer come into contact with each other. This point will be described below.

The inventors have thought that the logarithmic decrement measured by the method described above is a value which may be an index for the amount of pressure sensitive adhesive components present on the surface of the back coating layer. Specifically, it is thought that the value of the logarithmic decrement increases, as the amount of pressure sensitive adhesive components present on the surface of the back coating layer increases, and the value of the logarithmic decrement decreases, as the amount of pressure sensitive adhesive components decreases. The inventors have surmised that the surface of the back coating layer in which the logarithmic decrement is equal to or smaller than 0.060 is in a state where the amount of pressure sensitive adhesive components which is obstruction of movement of the liquid components from the surface of the magnetic layer is decreased. The details of the pressure sensitive adhesive components are not clear, but the inventors have surmised that the pressure sensitive adhesive components may be derived from a resin used as a binding agent. The specific description is as follows. As a binding agent, various resins can be used as will be described later in detail. The resin is a polymer (including a homopolymer or a copolymer) of two or more polymerizable compounds and generally also includes a component having a molecular weight which is smaller than an average molecular weight (hereinafter, referred to as a "binding agent component having a low molecular weight"). The inventors have surmised that the binding agent component having a low molecular weight which is present on the surface of the back coating layer may be obstruction of movement of the liquid components from the surface of the magnetic layer to the surface of the back coating layer. The inventors have surmised that, the binding agent component having a low molecular weight may have pressure sensitive adhesive properties and the logarithmic decrement acquired by a pendulum viscoelasticity test may be an index for the amount of the pressure sensitive adhesive components present on the surface of the back coating layer. In one aspect, the back coating layer is formed by applying a back coating layer forming composition including a curing agent in addition to non-magnetic powder and a binding agent onto a non-magnetic support and performing curing process. With the curing process here, it is possible to allow a curing reaction (crosslinking reaction) between the binding agent and the curing agent. However, although the reason thereof is not clear, the inventors have considered that the binding agent component having a low molecular weight may have poor reactivity regarding the curing reaction. Accordingly, the inventors have surmised that the binding agent component having a low molecular weight which hardly remains in the back coating layer and is easily separated to the surface of the back coating layer may be one of reasons for that the binding agent component having a low molecular weight is present on the surface of the back coating layer.

A specific aspect of a method for adjusting the logarithmic decrement will be described later.

1-Bromonaphthalene Contact Angle of Magnetic Layer

The 1-bromonaphthalene contact angle measured regarding the surface of the magnetic layer of the magnetic tape is 45.0° to 55.0°. The inventors have considered that the surface of the magnetic layer having the 1-bromonaphthalene contact angle in the range described above has properties of hardly adsorbing liquid components. The inventors have thought that this point contributes to prevention of a deterioration in sliding properties due to a decrease in the amount of liquid components on the surface of the magnetic layer. As described above, it is thought that the liquid components attached to the surface of the magnetic layer which easily moves to the back coating layer, contributes to prevention of a decrease in the sliding properties due to a decrease in amount of liquid components present on the surface of the magnetic layer. As a result, it is surmised that it is possible to prevent cut scraps generated due to chipping of the surface of the magnetic layer at the time of sliding of the surface of the magnetic layer and the head, from becoming head attached materials causing the spacing loss which is a reason of a decrease in reproduction output. From a viewpoint of further preventing a decrease in reproduction output, the 1-bromonaphthalene contact angle measured regarding the surface of the magnetic layer is preferably equal to or greater than 45.5°, more preferably equal to or greater than 46.0°, even more preferably equal to or greater than 46.5°, still preferably equal to or greater than 47.0°, and still more preferably equal to or greater than 47.5°, and still even more preferably equal to or greater than 48.0°. In addition, from a viewpoint of manufacturing easiness, the 1-bromonaphthalene contact angle measured regarding the surface of the magnetic layer is preferably equal to or smaller than 54.0°, more preferably equal to or smaller than 53.5°, even more preferably equal to or smaller than 53.0°, still preferably equal to or smaller than 52.5°, and still more preferably equal to or smaller than 52.00.

The 1-bromonaphthalene contact angle measured regarding the surface of the magnetic layer can be controlled by using a component capable of adjusting the 1-bromonaphthalene contact angle (hereinafter, also referred to as a "l-bromonaphthalene contact angle adjusting component") and adjusting a content of such a component. For example, a value of the 1-bromonaphthalene contact angle can be increased by using a component which can exhibit an operation of increasing the value of the 1-bromonaphthalene contact angle, as the 1-bromonaphthalene contact angle adjusting component, and increasing the content of the component.

As an example of the 1-bromonaphthalene contact angle adjusting component, a lubricant can be used. In addition, a polymer which will be described later specifically can also be used. For example, by using one or more kinds of 1-bromonaphthalene contact angle adjusting components selected from the group consisting of the lubricant and the polymer which will be described later, it is possible to obtain the magnetic tape in which the 1-bromonaphthalene contact angle measured regarding the surface of the magnetic layer is 45.0° to 55.0°. In one aspect, it is possible to form a magnetic layer by using one or more lubricants are used as the 1-bromonaphthalene contact angle adjusting component, without using a polymer which will be described later. In another aspect, it is possible to form a magnetic layer by using one or more polymers which will be described later as the 1-bromonaphthalene contact angle adjusting component, without using lubricants. In still another aspect, it is possible to form a magnetic layer by using one or more lubricants and one or more polymers which will be described later together as the 1-bromonaphthalene contact angle adjusting component.

1-Bromonaphthalene Contact Angle Adjusting Component

The 1-bromonaphthalene contact angle adjusting component is a component capable of adjusting the 1-bromonaphthalene contact angle measured regarding the surface of the magnetic layer. Hereinafter, the 1-bromonaphthalene contact angle adjusting component is also referred to as a 1-bromonaphthalene contact angle adjusting agent. Here, the expression "capable of adjusting" means an operation of changing the 1-bromonaphthalene contact angle can be exhibited. The exhibiting of such an operation can be confirmed with a change in the 1-bromonaphthalene contact angle measured regarding the surface of the magnetic layer in accordance with presence or absence of the 1-bromonaphthalene contact angle adjusting component. The 1-bromonaphthalene contact angle adjusting component preferably exhibits an operation of increasing a value of the 1-bromonaphthalene contact angle. One aspect of the 1-bromonaphthalene contact angle adjusting component is a lubricant, and another aspect thereof is a polymer which will be described later. Hereinafter, these components will be described in order.

Lubricant

As the lubricant, various lubricants normally used in various magnetic recording media such as fatty acid, fatty acid ester, or fatty acid amide can be used. As the content of the lubricant included in the magnetic layer is great, a value of the 1-bromonaphthalene contact angle measured regarding the surface of the magnetic layer tends to increase.

Examples of fatty acid include lauric acid, myristic acid, palmitic acid, stearic acid, oleic acid, linoleic acid, linolenic acid, behenic acid, erucic acid, and elaidic acid, and stearic acid, myristic acid, and palmitic acid are preferable, and stearic acid is more preferable. Fatty acid may be included in the magnetic layer in a state of salt such as metal salt.

As fatty acid ester, esters of various fatty acids described above, for example, butyl myristate, butyl palmitate, butyl stearate, neopentyl glycol dioleate, sorbitan monostearate, sorbitan distearate, sorbitan tristearate, oleyl oleate, isocetyl stearate, isotridecyl stearate, octyl stearate, isooctyl stearate, amyl stearate, and butoxyethyl stearate can be used.

As fatty acid amide, amide of various fatty acid, for example, lauric acid amide, myristic acid amide, palmitic acid amide, and stearic acid amide can be used.

The content of fatty acid in the magnetic layer forming composition is, for example, 0 to 10.0 parts by mass, preferably 0.1 to 10.0 parts by mass, more preferably 0.5 to 8.0 parts by mass, and even more preferably 1.0 to 7.0 parts by mass, with respect to 100.0 parts by mass of the ferromagnetic powder. In a case of using two or more kinds of different fatty acids as the fatty acid, the content thereof is the total content thereof. The same applies to other components. That is, in the invention and the specification, a given component may be used alone or used in combination of two or more kinds thereof, unless otherwise noted. In a case where two or more kinds of components are included as certain components, the content of the component is a total content of the two or more kinds thereof, unless otherwise noted.

The content of fatty acid ester is for example, 0.1 to 10.0 parts by mass, preferably 0.5 to 8.0 parts by mass, and more preferably 1.0 to 7.0 parts by mass with respect to 100.0 parts by mass of the ferromagnetic powder, as the content of fatty acid ester in the magnetic layer forming composition.

The content of fatty acid amide in the magnetic layer forming composition is, for example, 0 to 3.0 parts by mass, preferably 0 to 2.0 parts by mass, and more preferably 0 to 1.0 part by mass with respect to 100.0 parts by mass of the ferromagnetic powder.

In addition, in a case where the magnetic tape includes a non-magnetic layer between the non-magnetic support and the magnetic layer, the lubricant may or may not include in the non-magnetic layer. Normally, at least some lubricant included in the non-magnetic layer moves to the magnetic layer side and can be present in the magnetic layer. The content of fatty acid in the non-magnetic layer forming composition is, for example, 0 to 10.0 parts by mass, preferably 1.0 to 10.0 parts by mass, and more preferably 1.0 to 7.0 parts by mass with respect to 100.0 parts by mass of the non-magnetic powder. The content of fatty acid ester is, for example, 0 to 10.0 parts by mass and preferably 0.1 to 8.0 parts by mass with respect to 100.0 parts by mass of the non-magnetic powder. The content of fatty acid amide in the non-magnetic layer forming composition is, for example, 0 to 3.0 parts by mass and preferably 0 to 1.0 parts by mass with respect to 100.0 parts by mass of the non-magnetic powder.

Fatty acid and one or more derivatives of fatty acid are preferably used in combination, one or more components selected from the group consisting of fatty acid ester and fatty acid amide, and fatty acid are more preferably used in combination, and fatty acid, fatty acid ester, and fatty acid amide are even more preferably used in combination.

In a case where fatty acid and a derivative (ester and amide) of fatty acid are used in combination, a part derived from fatty acid of the fatty acid derivative preferably has a structure which is the same as or similar to that of fatty acid used in combination. As an example, in a case of using stearic acid as fatty acid, it is preferable to use stearic acid ester such as butyl stearate and/or stearic acid amide.

As the lubricant, a lubricant disclosed in a paragraph 0111 of JP2009-96798A can be used.

Nitrogen-Containing Polymer

As one aspect of the 1-bromonaphthalene contact angle adjusting component, a nitrogen-containing polymer can be used. It is assumed that a polymer chain included in the nitrogen-containing polymer contributes to an increase in 1-bromonaphthalene contact angle measured regarding the surface of the magnetic layer. The nitrogen-containing polymer is a polymer including nitrogen atoms in a structure. Examples of preferable nitrogen-containing polymer include a polyalkyleneimine-based polymer which is one of amine-based polymer, and an amine-based polymer other than the polyalkyleneimine-based polymer. The polyalkyleneimine-based polymer is a polymer including one or more polyalkyleneimine chains. For details of the polyalkyleneimine-based polymer, descriptions disclosed in paragraphs 0035 to 0077 of JP2016-51493A can be referred to. In addition, for details of the amine-based polymer, descriptions disclosed in paragraphs 0078 to 0080 of JP2016-51493A can be referred to.

In addition, in one aspect, the nitrogen-containing polymer is preferably a polymer in which a weight-average molecular weight is in a range not exceeding a weight-average molecular weight of a binding agent included in the magnetic layer. For example, the weight-average molecular weight of the nitrogen-containing polymer can be equal to or smaller than 80,000, equal to or smaller than 60,000, equal to or smaller than 40,000, equal to or smaller than 35,000, equal to or smaller than 30,000, equal to or smaller than 20,000, or equal to or smaller than 10,000. In addition, the weight-average molecular weight of the nitrogen-containing polymer can be, for example, equal to or greater than 1,000, equal to or greater than 1,500, equal to or greater than 2,000, or equal to or greater than 3,000. The weight-average molecular weight in the invention and the specification is a value obtained by performing polystyrene conversion of a value measured by gel permeation chromatography (GPC), unless otherwise noted. As the measurement conditions, the following conditions can be used. The weight-average molecular weight shown in examples which will be described later is a value obtained by performing polystyrene conversion of a value measured under the following measurement conditions, unless otherwise noted.

GPC device: HLC-8120 (manufactured by Tosoh Corporation)

Column: TSK gel Multipore HXL-M (manufactured by Tosoh Corporation, 7.8 mmID (inner diameter)×30.0 cm)

Eluent: Tetrahydrofuran (THF)

In a case of adjusting the 1-bromonaphthalene contact angle measured regarding the surface of the magnetic layer by using the nitrogen-containing polymer, the content of the nitrogen-containing polymer in the magnetic layer is preferably equal to or greater than 0.5 parts by mass and more preferably equal to or greater than 1.0 part by mass with respect to 100.0 parts by mass of the ferromagnetic powder. From a viewpoint of high-density recording, it is preferable that the content of other components in the magnetic layer is relatively low, in order to increase a filling percentage of the ferromagnetic powder. From this viewpoint, the content of the nitrogen-containing polymer in the magnetic layer is preferably equal to or smaller than 50.0 parts by mass, more preferably equal to or smaller than 40.0 parts by mass, even more preferably equal to or smaller than 30.0 parts by mass, still preferably equal to or smaller than 20.0 parts by mass, and still more preferably equal to or smaller than 15.0 parts by mass, with respect to 100.0 parts by mass of ferromagnetic powder.

In addition, for the controlling method of the 1-bromonaphthalene contact angle, descriptions disclosed in paragraphs 0095 to 0098 of JP2016-51493A can be referred to.

Next, the magnetic layer and the like of the magnetic tape will be described more specifically.

Magnetic Layer

Ferromagnetic Powder

As the ferromagnetic powder included in the magnetic layer, ferromagnetic powder normally used in the magnetic layer of various magnetic recording media can be used. It is preferable to use ferromagnetic powder having a small average particle size, from a viewpoint of improvement of recording density of the magnetic tape. From this viewpoint, ferromagnetic powder having an average particle size equal to or smaller than 50 nm is preferably used as the ferromagnetic powder. Meanwhile, the average particle size of the ferromagnetic powder is preferably equal to or greater than 10 nm, from a viewpoint of stability of magnetization.

As a preferred specific example of the ferromagnetic powder, ferromagnetic hexagonal ferrite powder can be used. An average particle size of the ferromagnetic hexagonal ferrite powder is preferably 10 nm to 50 nm and more preferably 20 nm to 50 nm, from a viewpoint of improvement of recording density and stability of magnetization. For details of the ferromagnetic hexagonal ferrite powder, descriptions disclosed in paragraphs 0012 to 0030 of JP2011-225417A, paragraphs 0134 to 0136 of JP2011-216149A, and paragraphs 0013 to 0030 of JP2012-204726A can be referred to, for example.

As a preferred specific example of the ferromagnetic powder, ferromagnetic metal powder can also be used. An average particle size of the ferromagnetic metal powder is preferably 10 nm to 50 nm and more preferably 20 nm to 50 nm, from a viewpoint of improvement of recording density and stability of magnetization. For details of the ferromagnetic metal powder, descriptions disclosed in paragraphs 0137 to 0141 of JP2011-216149A and paragraphs 0009 to 0023 of JP2005-251351A can be referred to, for example.

In the invention and the specification, average particle sizes of various powder such as the ferromagnetic powder and the like are values measured by the following method with a transmission electron microscope, unless otherwise noted.

The powder is imaged at a magnification ratio of 100,000 with a transmission electron microscope, the image is printed on printing paper so that the total magnification of 500,000 to obtain an image of particles configuring the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles arbitrarily extracted. An arithmetical mean of the particle size of 500 particles obtained as described above is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. The average particle size shown in examples which will be described later is a value measured by using transmission electron microscope H-9000 manufactured by Hitachi, Ltd. as the transmission electron microscope, and image analysis software KS-400 manufactured by Carl Zeiss as the image analysis software, unless otherwise noted. In the invention and the specification, the powder means an aggregate of a plurality of particles. For example, the ferromagnetic powder means an aggregate of a plurality of ferromagnetic particles. The aggregate of the plurality of particles not only includes an aspect in which particles configuring the aggregate directly come into contact with each other, and also includes an aspect in which a binding agent or an additive which will be described later is interposed between the particles. A term "particles" is also used for describing the powder.

As a method of collecting a sample powder from the magnetic tape in order to measure the particle size, a method disclosed in a paragraph of 0015 of JP2011-048878A can be used, for example.

In the invention and the specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetical mean of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, in a case of the definition (2), the average particle size is an average plate diameter, and an average plate ratio is an arithmetical mean of (maximum long diameter/thickness or height). In a case of the definition (3), the average particle size is an average diameter (also referred to as an average particle diameter).

The content (filling percentage) of the ferromagnetic powder of the magnetic layer is preferably 50 to 90 mass % and more preferably 60 to 90 mass %. The components other than the ferromagnetic powder of the magnetic layer are at least a binding agent and one or more kinds of additives may be arbitrarily included. A high filling percentage of the ferromagnetic powder in the magnetic layer is preferable from a viewpoint of improvement recording density.

Binding Agent

The magnetic tape is a coating type magnetic tape, and the magnetic layer includes a binding agent together with the ferromagnetic powder. As the binding agent, one or more kinds of resin is used. The resin may be a homopolymer or a copolymer. As the binding agent, various resins normally used as a binding agent of the coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins can be used as the binding agent even in the non-magnetic layer and/or a back coating layer which will be described later. For the binding agent described above, description disclosed in paragraphs 0028 to 0031 of JP2010-24113A can be referred to. An average molecular weight of the resin used as the binding agent can be, for example, 10,000 to 200,000 as a weight-average molecular weight.

In addition, a curing agent can also be used together with the binding agent. As the curing agent, in one aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in the magnetic layer forming step. The preferred curing agent is a thermosetting compound, polyisocyanate is suitable. For details of the polyisocyanate, descriptions disclosed in paragraphs 0124 and 0125 of JP2011-216149A can be referred to, for example. The amount of the curing agent can be, for example, 0 to 80.0 parts by mass with respect to 100.0 parts by mass of the binding agent in the magnetic layer forming composition, and is preferably 50.0 to 80.0 parts by mass, from a viewpoint of improvement of strength of each layer such as the magnetic layer.

Other Components

The magnetic layer may include one or more kinds of additives, if necessary, together with the various components described above. As the additives, a commercially available product can be suitably selected and used according to the desired properties. Alternatively, a compound synthesized by a well-known method can be used as the additives. As the additives, the curing agent described above is used as an example. In addition, examples of the additive which can be included in the magnetic layer include a dispersing agent, a dispersing assistant, an antibacterial agent, an antistatic agent, an antioxidant, and carbon black.

As an example of the additive, non-magnetic powder can be used. One aspect of the non-magnetic powder is non-magnetic powder which can function as an abrasive (hereinafter, referred to as an "abrasive"). The magnetic layer including an abrasive can include a dispersing agent disclosed in paragraphs 0012 to 0022 of JP2013-131285A, in order to improve dispersibility of the abrasive. For the details of the abrasive, descriptions disclosed in paragraphs 0023 and 0024 of JP2013-131285A can also be referred to.

One aspect of the non-magnetic powder is non-magnetic filler (hereinafter, referred to as a "projection formation agent") which can function as a projection formation agent which forms projections suitably protruded from the surface of the magnetic layer. As the projection formation agent, inorganic oxide powder, inorganic oxide colloidal particles, and the like can be used. In the invention and the specification, the "colloidal particles" are particles which are not precipitated and dispersed to generate a colloidal dispersion, in a case where 1 g of the particles is added to 100 mL of at least one organic solvent of at least methyl ethyl ketone, cyclohexanone, toluene, or ethyl acetate, or a mixed solvent including two or more kinds of the solvent described above at an arbitrary mixing ratio. For details of the projection formation agent, descriptions disclosed in paragraphs 0013 to 0028 of JP2011-048878A can be referred to. The average particle size of the colloidal silica (silica colloidal particles) shown in the examples which will be described later is a value obtained by a method disclosed in a paragraph 0015 of JP2011-048878A as a measurement method of an average particle diameter, and a coefficient of variation showing the examples which will be described later is a value obtained by a method disclosed in the same paragraph. A sphericity showing in the examples which will be described later is a value obtained by a method disclosed in a paragraph 0020 of JP2011-048878A as a measurement method of a circularity.

In the other aspect, the projection formation agent is preferably carbon black.

Back Coating Layer

Non-Magnetic Powder

As the non-magnetic powder included in the back coating layer, any one or both of carbon black and non-magnetic powder other than carbon black can be used. As the non-magnetic powder other than carbon black, powder of inorganic substances (inorganic powder) can be used. Specific examples thereof include inorganic powder of iron oxide (for example, red oxide), titanium oxide such as titanium dioxide, cerium oxide, tin oxide, tungsten oxide, ZnO, $ZrO_2$, $SiO_2$, $Cr_2O_3$, α-alumina, β-alumina, γ-alumina, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, and silicon carbide. For the non-magnetic powder included in the back coating layer, the description which will be described later regarding the non-magnetic powder included in the non-magnetic layer can also be referred to.

The shape of the non-magnetic powder other than carbon black may be a shape of any of a needle shape, a sphere shape, a polyhydron shape, and a planar shape. An average particle size of the non-magnetic powder is preferably 0.005 to 2.00 μm and more preferably 0.01 to 0.20 μm. In addition, a specific surface area of the non-magnetic powder obtained by a Brunauer-Emmett-Teller (BET) method (BET specific surface area) is preferably 1 to 100 $m^2/g$, more preferably 5 to 70 $m^2/g$, and even more preferably 10 to 65 $m^2/g$. Meanwhile, an average particle size of carbon black is, for example, 5 to 80 nm, preferably 10 to 50 nm, and more preferably 10 to 40 nm. For the content (filling percentage) of the non-magnetic powder of the back coating layer, the description regarding the content of the non-magnetic powder of the non-magnetic layer which will be described later can be referred to. In addition, the content of carbon black with respect to 100.0 parts by mass of the entire non-magnetic powder can be, for example, 10.0 to 100.0 parts by mass. The entire non-magnetic powder may be carbon black. In addition, the entire non-magnetic powder may be non-magnetic powder other than carbon black.

The back coating layer further includes a binding agent and can arbitrarily include well-known additives. For other details of the binding agent and additives of the back coating layer, a well-known technology regarding the back coating layer can be applied, and a well-known technology regarding the magnetic layer and/or the non-magnetic layer can also be applied. In addition, the above description regarding the magnetic layer and the description which will be described later regarding the non-magnetic layer can also be referred to.

Non-Magnetic Layer

Next, the non-magnetic layer will be described. The magnetic tape may include a magnetic layer directly on a non-magnetic support, or may include a non-magnetic layer including non-magnetic powder and a binding agent between the non-magnetic support and the magnetic layer. The non-magnetic powder used in the non-magnetic layer may be powder of inorganic substances (inorganic powder) or powder of organic substances (organic powder). In addition, carbon black and the like can be used. Examples of the inorganic powder include powder of metal, metal oxide, metal carbonate, metal sulfate, metal nitride, metal carbide, and metal sulfide. These non-magnetic powder can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-24113A can be referred to. The content (filling percentage) of the non-magnetic powder of the non-magnetic layer is preferably 50 to 90 mass % and more preferably 60 to 90 mass %.

In regards to other details of a binding agent or additives of the non-magnetic layer, the well-known technology regarding the non-magnetic layer can be applied. In addition, in regards to the type and the content of the binding agent, and the type and the content of the additive, for example, the well-known technology regarding the magnetic layer can be applied.

The non-magnetic layer of the magnetic tape also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 7.96 kA/m(100 Oe), or a layer having a residual magnetic flux density equal to or smaller than 10 mT and coercivity equal to or smaller than 7.96 kA/m(100 Oe). It is preferable that the non-magnetic layer does not have a residual magnetic flux density and coercivity.

Non-Magnetic Support

Next, the non-magnetic support will be described. As the non-magnetic support (hereinafter, also simply referred to as a "support"), well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma treatment, easy-bonding treatment, or heating treatment may be performed with respect to these supports in advance.

Various Thickness

A thickness of the non-magnetic support is preferably 3.00 to 6.00 μm.

A thickness of the magnetic layer is preferably equal to or smaller than 0.15 μm and more preferably equal to or smaller than 0.10 μm, from a viewpoint of realization of high-density recording required in recent years. The thickness of the magnetic layer is even more preferably 0.01 to 0.10 μm. The magnetic layer may be at least single layer, the magnetic layer may be separated into two or more layers having different magnetic properties, and a configuration of a well-known multilayered magnetic layer can be applied. A thickness of the magnetic layer in a case where the magnetic layer is separated into two or more layers is a total thickness of the layers.

A thickness of the non-magnetic layer is, for example, 0.10 to 1.50 μm and is preferably 0.10 to 1.00 μm.

A thickness of the back coating layer is preferably equal to or smaller than 0.90 μm and even more preferably 0.10 to 0.70 μm.

The thicknesses of various layers of the magnetic tape and the non-magnetic support can be acquired by a well-known film thickness measurement method. As an example, a cross section of the magnetic tape in a thickness direction is, for example, exposed by a well-known method of ion beams or microtome, and the exposed cross section is observed with a scanning electron microscope. In the cross section observation, various thicknesses can be acquired as a thickness acquired at one position of the cross section in the thickness direction, or an arithmetical mean of thicknesses acquired at a plurality of positions of two or more positions, for example, two positions which are arbitrarily extracted. In addition, the thickness of each layer may be acquired as a designed thickness calculated according to the manufacturing conditions.

Manufacturing Method

Preparation of Each Layer Forming Composition

Each composition for forming the magnetic layer, the back coating layer, or the non-magnetic layer, which is arbitrarily provided, normally includes a solvent, together with various components described above. As the solvent, various organic solvents generally used for manufacturing a coating type magnetic recording medium can be used. Among those, from a viewpoint of solubility of the binding agent normally used in the coating type magnetic recording medium, each layer forming composition preferably includes one or more ketone solvents such as acetone, methyl ethyl ketone, methyl isobutyl ketone, diisobutyl ketone, cyclohexanone, isophorone, and tetrahydrofuran. The amount of the solvent of each layer forming composition is not particularly limited, and can be set to be the same as that of each layer forming composition of a typical coating type magnetic recording medium. In addition, steps of preparing a composition for forming each layer generally include at least a kneading step, a dispersing step, and a mixing step provided before and after these steps, if necessary. Each step may be divided into two or more stages. All of raw materials used in the invention may be added at an initial stage or in a middle stage of each step. In addition, each raw material may be separately added in two or more steps. In order to manufacture the magnetic tape, a well-known manufacturing technology can be used. In the kneading step, an open kneader, a continuous kneader, a pressure kneader, or a kneader having a strong kneading force such as an extruder is preferably used. The details of the kneading processes of these kneaders are disclosed in JP1989-106338A (JP-H01-106338A) and JP1989-79274A (JP-H01-79274A). In addition, in order to disperse each layer forming composition, glass beads and one or more kinds of other dispersion beads can be used as dispersion media. As such dispersion beads, zirconia beads, titania beads, and steel beads which are dispersion beads having high specific gravity are suitable. These dispersion beads can be used by optimizing a particle diameter (bead diameter) and a filling percentage of the dispersion beads. As a dispersing machine, a well-known dispersing machine can be used. The each layer forming composition may be filtered by a well-known method before performing the coating step. The filtering can be performed by using a filter, for example. As the filter used in the filtering, a filter having a hole diameter of 0.01 to 3 μm can be used, for example.

Coating Step, Cooling Step, Heating and Drying Step, Burnishing Treatment Step, and Curing Step The magnetic layer can be formed by directly applying the magnetic layer forming composition onto the surface of the non-magnetic support or by performing multilayer coating of the magnetic layer forming composition with the non-magnetic layer forming composition in order or at the same time. For details of the coating for forming each layer, a description disclosed in paragraph 0066 of JP2010-231843A can be referred to.

In a preferred aspect, the magnetic tape can be manufactured by successive multilayer coating of the non-magnetic layer forming composition and the magnetic layer forming composition. A manufacturing step including the successive multilayer coating can be preferably performed as follows. The non-magnetic layer is formed through a coating step of applying a non-magnetic layer forming composition onto a surface of a non-magnetic support to form a coating layer, and a heating and drying step of drying the formed coating layer by a heating process. In addition, the magnetic layer can be formed through a coating step of applying a magnetic layer forming composition onto the surface of the formed non-magnetic layer to form a coating layer, and a heating and drying step of drying the formed coating layer by a heating process.

Meanwhile, the back coating layer is formed on a surface side of the non-magnetic support opposite to a surface where the magnetic layer is formed (or is to be formed). The back coating layer can be preferably formed through a coating step of applying a back coating layer forming composition onto a surface of a non-magnetic support to form a coating layer, and a heating and drying step of drying the formed coating layer by a heating process.

In a preferred aspect, the magnetic tape can be manufactured by a manufacturing method in which a back coating layer forming step includes a coating step of applying a back coating layer forming composition including non-magnetic powder, a binding agent, a curing agent, and a solvent onto a surface of a non-magnetic support to form a coating layer, a heating and drying step of drying the coating layer by a heating process, and a curing step of performing a curing process with respect to the coating layer, a cooling step of cooling the coating layer is included between the coating step and the heating and drying step, and a burnishing treatment step of performing a burnishing treatment with respect to the surface of the coating layer is included between the heating and drying step and the curing step.

The inventors have thought that it is preferable to perform the cooling step and the burnishing treatment step in the back coating layer forming step of the manufacturing method, in order to set the logarithmic decrement measured regarding the surface of the back coating layer to be equal to or smaller than 0.060. A more specific description is as follows.

The inventors have surmised that performing the cooling step of cooling the coating layer between the coating step and the heating and drying step contributes to causing pressure sensitive adhesive component separated from the surface of the back coating layer to be localized in the surface and/or a surface layer part in the vicinity of the surface of the coating layer. The inventors have thought that this is because the pressure sensitive adhesive component at the time of solvent volatilization in the heating and drying step is easily moved to the surface and/or the surface layer part of the coating layer, by cooling the coating layer before the heating and drying step. However, the reason thereof is not clear. In addition, the inventors have thought that the pressure sensitive adhesive component can be removed by performing the burnishing treatment with respect to the surface of the coating layer in which the pressure sensitive adhesive component is localized on the surface and/or surface layer part. The inventors have surmised that performing the curing step after removing the pressure sensitive adhesive component contributes to the setting of the logarithmic decrement measured regarding the surface of the back coating layer to be equal to or smaller than 0.060. However, this is merely a surmise, and the invention is not limited thereto.

Hereinafter, a specific aspect of the manufacturing method of the magnetic tape will be described with reference to FIG. 4, as an example. However, the invention is not limited to the following specific aspect.

Figure 4:
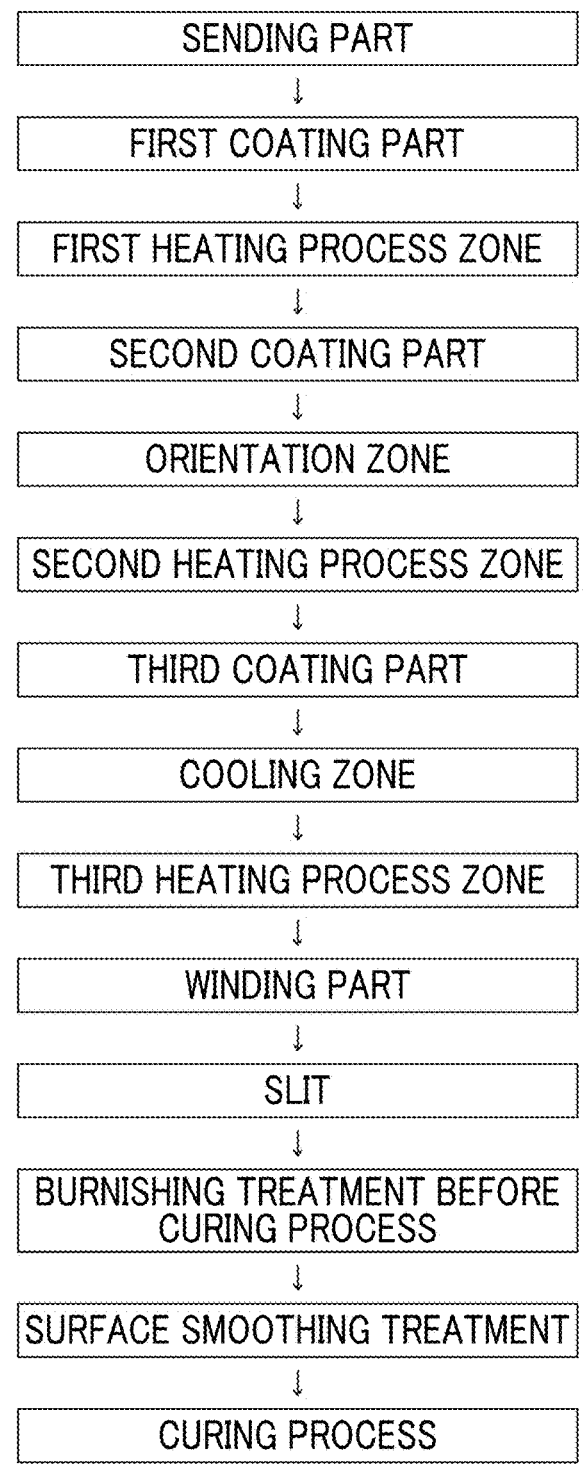
FIG. 4 shows an example (step schematic view) of a specific aspect of a magnetic tape manufacturing step.

FIG. 4 is a step schematic view showing a specific aspect of a step of manufacturing the magnetic tape including a non-magnetic layer and a magnetic layer in this order on one surface side of a non-magnetic support and including a back coating layer on the other surface side thereof. In the aspect shown in FIG. 4, an operation of sending a non-magnetic support (elongated film) from a sending part and winding the non-magnetic support around a winding part is continuously performed, and various processes of coating, drying, and orientation are performed in each part or each zone shown in FIG. 4, and thus, it is possible to sequentially form a non-magnetic layer and a magnetic layer on one surface side of the running non-magnetic support by multilayer coating and to form a back coating layer on the other surface side thereof. Such a manufacturing step can be set to be identical to the manufacturing method normally performed for manufacturing a coating type magnetic recording medium, except for including a cooling zone in the back coating layer forming step and including the burnishing treatment step before the curing process.

The non-magnetic layer forming composition is applied onto the non-magnetic support sent from the sending part in a first coating part, and a coating layer of the non-magnetic layer forming composition is formed (coating step of non-magnetic layer forming composition).

In a first heating process zone, the coating layer of the non-magnetic layer forming composition is dried by heating the formed coating layer (heating and drying step). The heating and drying process can be performed by causing the non-magnetic support including the coating layer after the coating step to pass through the heated atmosphere. An atmosphere temperature of the heated atmosphere here is, for example, approximately 60° to 140°. Here, the atmosphere temperature may be a temperature at which the solvent is volatilized and the coating layer is dried, and the atmosphere temperature is not limited to the range described above. In addition, the heated air may arbitrarily blow to the surface of the coating layer. The points described above are also applied to a heating and drying step of a second heating process zone and a heating and drying step of a third heating process zone which will be described later, in the same manner.

Next, in a second coating part, the magnetic layer forming composition is applied onto the surface of the non-magnetic layer formed by performing the heating and drying step in the first heating process zone, and a coating layer of the magnetic layer forming composition is formed (coating step of magnetic layer forming composition).

After that, while the coating layer of the magnetic layer forming composition is wet, an orientation process of the ferromagnetic powder in the coating layer is performed in an orientation zone. For the orientation process, a description disclosed in a paragraph 0052 of JP2010-24113A can be referred to.

The coating layer after the orientation process is subjected to the heating and drying step in the second heating process zone.

Next, in the third coating part, a back coating layer forming composition is applied to a surface of the non-magnetic support on a side opposite to a surface where the non-magnetic layer and the magnetic layer are formed, to form a coating layer (coating step of back coating layer forming composition).

After the coating step, a coating layer of the back coating layer forming composition formed in the coating step is cooled in a cooling zone (cooling step). For example, it is possible to perform the cooling step by allowing the non-magnetic support on which the coating layer is formed to pass through a cooling atmosphere. An atmosphere temperature of the cooling atmosphere is preferably −10° C. to 0° C. and more preferably −5° C. to 0° C. The time for performing the cooling step (for example, time while an arbitrary part of the coating layer is delivered to and sent from the cooling zone (hereinafter, also referred to as a "staying time")) is not particularly limited. In a case where the staying time is long, the value of logarithmic decrement tends to be increased. Thus, the staying time is preferably adjusted by performing preliminary experiment if necessary, so that the logarithmic decrement equal to or smaller than 0.060 is realized. In the cooling step, cooled air may blow to the surface of the coating layer.

After that, the coating layer after the cooling step is heated and dried in the third heating process zone.

By doing so, it is possible to obtain the magnetic tape including the non-magnetic layer and the magnetic layer in this order on one surface side of the non-magnetic support, and the coating layer of the back coating layer forming composition heated and dried on the other surface side thereof. The magnetic tape obtained here becomes a magnetic tape product after performing various processes which will be described later.

The obtained magnetic tape is wound around the winding part, and cut (slit) to have a size of a magnetic tape product. The slitting is performed by using a well-known cutter.

In the slit magnetic tape, the burnishing treatment is performed with respect to the surface of the heated and dried coating layer of the back coating layer forming composition, before performing the curing process (heating and light irradiation) in accordance with the types of the curing agent included in the back coating layer forming composition (burnishing treatment step between heating and drying step and curing step). The inventors have surmised that removing the pressure sensitive adhesive component transitioned to the surface and/or the surface layer part of the coating layer cooled in the cooling zone by the burnishing treatment contributes setting the logarithmic decrement of the back coating layer to be equal to or smaller than 0.060. However, as described above, this is merely a surmise, and the invention is not limited thereto.

The burnishing treatment is treatment of rubbing a surface of a treatment target with a member (for example, a polishing tape, or a grinding tool such as a grinding blade or a grinding wheel), and can be performed in the same manner as the well-known burnishing treatment for manufacturing a coating type magnetic recording medium. However, in the related art, the burnishing treatment was not performed in a stage before the curing step, after performing the cooling step and the heating and drying step. With respect to this, the logarithmic decrement of the back coating layer can be equal to or smaller than 0.060 by performing the burnishing treatment in the stage described above.

The burnishing treatment can be preferably performed by performing one or both of rubbing of the surface of the coating layer of the treatment target by a polishing tape (polishing) and rubbing of the surface of the coating layer of the treatment target by a grinding tool (grinding). As the polishing tape, a commercially available product may be used and a polishing tape manufactured by a well-known method may be used. As the grinding tool, a well-known grinding blade such as a fixed blade, a diamond wheel, or a rotary blade, or a grinding wheel can be used. In addition, a wiping treatment of wiping the surface of the coating layer rubbed by the polishing tape and/or the grinding tool with a wiping material. For details of preferred polishing tape, grinding tool, burnishing treatment, and wiping treatment, descriptions disclosed in paragraphs 0034 to 0048, FIG. 1 and examples of JP1994-52544A (JP-H06-52544A) can be referred to. As the burnishing treatment is reinforced, the value of the logarithmic decrement of the back coating layer tends to be decreased. The burnishing treatment can be reinforced as an abrasive having high hardness is used as the abrasive included in the polishing tape, and can be reinforced, as the amount of the abrasive in the polishing tape is increased. In addition, the burnishing treatment can be reinforced as a grinding tool having high hardness is used as the grinding tool. In regards to the burnishing treatment conditions, the burnishing treatment can be reinforced as a sliding speed between the surface of the coating layer of the treatment target and a member (for example, a polishing tape or a grinding tool) is increased. The sliding speed can be increased by increasing one or both of a speed at which the member is moved, and a speed at which the magnetic tape of the treatment target is moved.

After the burnishing treatment (burnishing treatment step), the curing process is performed with respect to the coating layer of the back coating layer forming composition. In the aspect shown in FIG. 4, the coating layer of the back coating layer forming composition is subjected to the surface smoothing treatment, after the burnishing treatment and before the curing process. The surface smoothing treatment is a process performed for increasing smoothness of the surface of the magnetic layer and/or the surface of the back coating layer of the magnetic tape and is preferably performed by a calender process. For details of the calender process, for example, description disclosed in a paragraph 0026 of JP2010-231843A can be referred to. As the calender process is reinforced, the surface of the magnetic tape can be smoothened. The calender process is reinforced, as the surface temperature (calender temperature) of a calender roll is increased and/or as calender pressure is increased.

After that, the curing process according to the type of the curing agent included in the coating layer is performed with respect to the coating layer of the back coating layer forming composition (curing step). The curing process can be performed by the process according to the type of the curing agent included in the coating layer, such as a heating process or light irradiation. The curing process conditions are not particularly limited, and the curing process conditions may be suitably set in accordance with the list of the back coating layer forming composition used in the coating layer formation, the type of the curing agent, and the thickness of the coating layer. For example, in a case where the coating layer is formed by using the back coating layer forming composition including polyisocyanate as the curing agent, the curing process is preferably the heating process. In a case where the curing agent is included in a layer other than the back coating layer, a curing reaction of the layer can also proceed by the curing process here. Alternatively, the curing step may be separately provided. After the curing step, the burnishing treatment may be further performed.

By doing so, it is possible to obtain a magnetic tape according to one aspect of the invention. However, the manufacturing method described above is merely an example, the magnetic layer surface roughness Ra, the logarithmic decrement of the back coating layer, and the 1-bromonaphthalene contact angle of the magnetic layer can be respectively controlled to be in the ranges described above by arbitrary methods capable of adjusting the magnetic layer surface roughness Ra, the logarithmic decrement of the back coating layer, and the 1-bromonaphthalene contact angle of the magnetic layer, and such an aspect is also included in the invention.

The magnetic tape according to one aspect of the invention described above is generally accommodated in a magnetic tape cartridge and the magnetic tape cartridge is mounted in a drive. The configuration of the magnetic tape cartridge and the drive is well known. The magnetic tape runs (is transported) in the drive, the magnetic head for recording and/or reproducing of information comes into contact with and slides on the surface of the magnetic layer, and the recording of the information on the magnetic tape and/or reproducing of the recorded information are performed. Since the magnetic tape is generally accommodated in the magnetic tape cartridge in a state of being wound around the reel, sending of the magnetic tape from the reel and winding thereof are performed during the running, and the surface of the magnetic layer comes into contact with the surface of the back coating layer. It is assumed that the movement of the liquid components adsorbed to the surface of the magnetic layer at the time of the contact, to the surface of the back coating layer, contributes to the improvement of sliding properties of the surface of the magnetic layer and the head. This point will be described later.

A running speed of the magnetic tape is also referred to as a transportation speed and is a relative speed of the magnetic tape and the head at the time of the magnetic tape running. It is preferable that the running speed is increased to cause the magnetic tape run at a high speed, in order to shorten the time necessary for recording information and/or time necessary for reproducing the recorded information. From this viewpoint, the running speed of the magnetic tape is, for example, preferably equal to or higher than 6.0 m/sec. Meanwhile, it was determined that, in the magnetic tape having the magnetic layer surface roughness Ra equal to or smaller than 1.8 nm, a decrease in reproduction output occurs, in a case of repeating the high-speed running in the environment of a high temperature and high humidity, without any measures. With respect to this, in the magnetic tape according to one aspect of the invention in which the magnetic layer surface roughness Ra is equal to or smaller than 1.8 nm and the logarithmic decrement of the back coating layer and the 1-bromonaphthalene contact angle of the magnetic layer are in the ranges described above, a decrease in reproduction output during the repeated high-speed running in the environment of a high temperature and high humidity can be prevented.

EXAMPLES

Hereinafter, the invention will be described with reference to examples. However, the invention is not limited to aspects shown in the examples. "Parts" and "%" in the following description mean "parts by mass" and "mass %", unless otherwise noted.

As a 1-bromonaphthalene contact angle adjusting agent described below, a polyalkyleneimine-based polymer synthesized by a method disclosed in paragraphs 0115 to 0124 of JP2016-51493A was used.

Example 1

A list of components of each layer forming composition is shown below.
Magnetic Layer Forming Composition
Magnetic Solution
Ferromagnetic hexagonal barium ferrite powder: 100.0 parts (Hc: 196 kA/m (2,460 Oe), average particle size (average plate diameter): 24 nm)
Oleic acid: 2.0 parts
A vinyl chloride copolymer (MR-104 manufactured by Zeon Corporation): 10.0 parts
$SO_3Na$ group-containing polyurethane resin: 4.0 parts
(Weight-average molecular weight: 70,000, $SO_3Na$ group: 0.07 meq/g)
1-Bromonaphthalene contact angle adjusting agent: 10.0 parts
Methyl ethyl ketone: 150.0 parts
Cyclohexanone: 150.0 parts
Abrasive Liquid
α-alumina (Brunauer-Emmett-Teller (BET) specific surface area: 19 $m^2$/g, sphericity: 1.4): 6.0 parts
$SO_3Na$ group-containing polyurethane resin
(Weight-average molecular weight: 70,000, $SO_3Na$ group: 0.1 meq/g): 0.6 parts
2,3-Dihydroxynaphthalene: 0.6 parts
Cyclohexanone: 23.0 parts
Projection Formation Agent Liquid
Colloidal silica (average particle size: see Table 1, coefficient of variation: 7%, sphericity: 1.03): 2.0 parts
Methyl ethyl ketone: 8.0 parts
Other Components
Stearic acid: see Table 1
Stearic acid amide: 0.3 parts
Butyl stearate: 6.0 parts
Methyl ethyl ketone: 110.0 parts
Cyclohexanone: 110.0 parts
Polyisocyanate (CORONATE (registered trademark) L manufactured by Nippon Polyurethane Industry Co., Ltd.): 3.0 parts
Non-Magnetic Layer Forming Composition
Carbon black (average particle size: 16 nm, dibutyl phthalate (DBP) oil absorption: 74 $cm^3$/100 g): 100.0 parts
Trioctylamine: 4.0 parts
A vinyl chloride copolymer (MR-104 manufactured by Zeon Corporation): 19.0 parts
$SO_3Na$ group-containing polyurethane resin
(Weight-average molecular weight: 50,000, $SO_3Na$ group: 0.07 meq/g): 12.0 parts
Methyl ethyl ketone: 370.0 parts
Cyclohexanone: 370.0 parts
Stearic acid: 2.0 parts
Stearic acid amide: 0.3 parts
Butyl stearate: 2.0 parts
Back Coating Layer Forming Composition A
Red oxide (average particle size: 0.15 μm, average acicular ratio: 7, BET specific surface area: 52 $m^2$/g): 80.0 parts
Carbon black (average particle size: 16 nm, DBP oil absorption: 74 $cm^3$/100 g): 20.0 parts
Phenylphosphonic acid: 3.0 parts
A vinyl chloride copolymer (MR-104 manufactured by Zeon Corporation): 12.0 parts
$SO_3Na$ group-containing polyurethane resin
(Weight-average molecular weight: 50,000, $SO_3Na$ group: 0.07 meq/g): 8.0 parts
α-alumina (BET specific surface area: 17 $m^2$/g): 5.0 parts
Methyl ethyl ketone: 370.0 parts
Cyclohexanone: 370.0 parts
Stearic acid: 1.0 part
Stearic acid amide: 0.3 parts
Butyl stearate: 2.0 parts
Polyisocyanate (CORONATE L manufactured by Nippon Polyurethane Industry Co., Ltd.): 5.0 parts 1. Manufacturing of Magnetic Tape Preparation of Magnetic Layer Forming Composition The magnetic layer forming composition was prepared by the following method.

The components of the magnetic solution were kneaded and diluted by an open kneader, and subjected to a dispersion process of 30 passes, with a transverse beads mill dispersing device and zirconia ($ZrO_2$) beads (hereinafter, referred to as "Zr beads") having a particle diameter of 0.1 mm by setting a bead filling percentage as 80 volume %, a circumferential speed of rotor distal end as 10 m/sec, and a retention time for 1 pass as 2 minutes.

The components of the abrasive liquid were mixed with each other and put in a transverse beads mill dispersing device together with Zr beads having a particle diameter of 0.3 mm, bead volume/(abrasive liquid volume+bead volume) was adjusted to be 80%, and beads mill dispersion process was performed for 120 minutes. Liquid after the process was extracted and subjected to an ultrasonic dispersion filtering process with a flow-type ultrasonic dispersion filtering device to obtain abrasive liquid.

The magnetic solution, the projection formation agent liquid, and the abrasive liquid, and other components described above were introduced into a dissolver stirrer, and were stirred at a circumferential speed of 10 m/sec for 30 minutes. After that, the treatment of 3 passes was performed with a flow-type ultrasonic dispersion device at a flow rate of 7.5 kg/min, and then, a magnetic layer forming composition was prepared by performing filtering with a filter having a hole diameter of 1 μm.

Preparation of Non-Magnetic Layer Forming Composition

The non-magnetic layer forming composition was prepared by the following method.

The components excluding a lubricant (stearic acid, stearic acid amide, and butyl stearate) were kneaded and diluted by an open kneader, and subjected to a dispersion process with a transverse beads mill dispersing device. Then, the lubricant (stearic acid, stearic acid amide, and butyl stearate) was added into the obtained dispersion liquid and stirred and mixed with a dissolver stirrer, and the non-magnetic layer forming composition was prepared.

Preparation of Back Coating Layer Forming Composition

The back coating layer forming composition was prepared by the following method.

The components excluding polyisocyanate and lubricant (stearic acid, stearic acid amide, and butyl stearate) were introduced into a dissolver stirrer, and were stirred at a circumferential speed of 10 m/sec for 30 minutes. After that, the dispersion process was performed with a transverse beads mill dispersing device. The polyisocyanate and lubricant (stearic acid, stearic acid amide, and butyl stearate) were added into the obtained dispersion liquid and stirred and mixed with a dissolver stirrer, and the back coating layer forming composition was prepared.

Manufacturing of Magnetic Tape

A magnetic tape was manufactured by the specific aspect shown in FIG. 4. The magnetic tape was specifically manufactured as follows.

A support made of polyethylene naphthalate having a thickness of 4.50 μm was sent from the sending part, and the non-magnetic layer forming composition was applied to one surface thereof so that the thickness after the drying becomes 0.40 μm in the first coating part and was dried in the first heating process zone (atmosphere temperature of 100° C.) to form a coating layer.

Then, the magnetic layer forming composition was applied onto the non-magnetic layer so that the thickness after the drying becomes 60 nm (0.06 μm) in the second coating part, and a coating layer was formed. While the formed coating layer is wet, a homeotropic alignment process was performed in the orientation zone by applying a magnetic field having a magnetic field strength of 0.3 T in a vertical direction, and then, the coating layer was dried in the second heating process zone (atmosphere temperature of 100° C.).

After that, in the third coating part, the back coating layer forming composition was applied to the surface of the support made of polyethylene naphthalate on a side opposite to the surface where the non-magnetic layer and the magnetic layer are formed, so that the thickness after the drying becomes 0.60 μm, to form a coating layer, and the cooling step was performed by causing the coating layer to pass through a cooling zone in which the atmosphere temperature was adjusted to 0° C. for the staying time shown in Table 1, while the formed coating layer is wet. After that, the coating layer was dried in the third heating process zone (atmosphere temperature of 100° C.).

The magnetic tape obtained as described above was slit to have a width of ½ inches (0.0127 meters), and the burnishing treatment and the wiping treatment were performed with respect to the surface of the coating layer of the back coating layer forming composition. The burnishing treatment and the wiping treatment were performed by using a commercially available polishing tape (product name: MA22000 manufactured by Fujifilm Corporation, abrasive: diamond/$Cr_2O_3$/red oxide) as the polishing tape, a commercially available sapphire blade (manufactured by Kyocera Corporation, a width of 5 mm, a length of 35 mm, and a tip angle of 60 degrees) as the grinding blade, and a commercially available wiping material (product name: WRP736 manufactured by Kuraray Co., Ltd.) as the wiping material, in a treatment device having a configuration disclosed in FIG. 1 of JP1994-52544A (JP-H06-52544A). For the treatment conditions, the treatment conditions disclosed in Example 12 of JP1994-52544A (JP-H06-52544A).

After the burnishing treatment and the wiping treatment, a calender process (surface smoothing treatment) was performed with a calender roll configured of only a metal roll, at a speed of 80 m/min, linear pressure of 300 kg/cm (294 kN/m), and a calender temperature (surface temperature of a calender roll) shown in Table 1.

After that, a curing process (heating process) was performed in the environment of the atmosphere temperature of 70° C. for 36 hours, and the magnetic tape was obtained.

By doing so, a magnetic tape of Example 1 was manufactured.

The thickness of each layer of the manufactured magnetic tape was acquired by the following method and it was confirmed that the acquired thickness is the thickness described above.

A cross section of the magnetic tape in a thickness direction was exposed to ion beams and the exposed cross section was observed with a scanning electron microscope.

Various thicknesses were obtained as an arithmetical mean of thicknesses obtained at two portions in the thickness direction in the cross section observation.

Examples 2 to 7 and Comparative Examples 1 to 7

A magnetic tape was manufactured by the same method as that in Example 1, except that various conditions were changed as shown in Table 1.

In Table 1, in the examples and the comparative examples in which "used" was shown in the column of the 1-bromonaphthalene contact angle adjusting agent, the same amount of the same 1-bromonaphthalene contact angle adjusting agent was used in the same manner as in Example 1. In Table 1, in the comparative examples in which "none" was shown in the column of the 1-bromonaphthalene contact angle adjusting agent, a polyalkyleneimine-based polymer used in Example 1 as the 1-bromonaphthalene contact angle adjusting agent was not used.

In Table 1, in the comparative examples in which "not performed" is disclosed in a column of the cooling zone staying time and a column of the burnishing treatment before the curing process, and "performed" is disclosed in a column of the burnishing treatment after the curing process, a magnetic tape was manufactured by a manufacturing step not including the cooling zone in the back coating layer forming step and performing the burnishing treatment and the wiping treatment by the same method as that in Example 1, not before the curing process, but after the curing process.

A part of each magnetic tape of the examples and the comparative examples manufactured by the method described above was used in the evaluation described below, and the other part was used in the evaluation of performance which will be described later.

2. Evaluation of Physical Properties of Magnetic Tape (1) Center Line Average Surface Roughness Ra Measured Regarding Surface of Magnetic Layer The measurement regarding a measurement area of 40 μm×40 μm in the surface of the magnetic layer of each magnetic tape of the examples and the comparative examples was performed with an atomic force microscope (AFM, Nanoscope 4 manufactured by Veeco Instruments, Inc.) in a tapping mode, and a center line average surface roughness Ra was acquired. RTESP-300 manufactured by BRUKER is used as a probe, a scan speed (probe movement speed) was set as 40 μm/sec, and a resolution was set as 512 pixel×512 pixel.

(2) Measurement of Logarithmic Decrement of Back Coating Layer

The logarithmic decrement of the surface of the back coating layer of the magnetic tape was acquired by the method described above by using a rigid-body pendulum type physical properties testing instrument RPT-3000W manufactured by A&D Company, Limited (pendulum: brass, substrate: glass substrate, a rate of temperature increase of substrate: 5° C./min) as the measurement device. A measurement sample cut out from the magnetic tape was placed on a glass substrate having a size of approximately 3 cm×approximately 5 cm, by being fixed at 4 portions with a fixing tape (Kapton tape manufactured by Du Pont-Toray Co., Ltd.) as shown in FIG. 1. An adsorption time was set as 1 second, a measurement interval was set as 7 to 10 seconds, a displacement-time curve was drawn regarding the 86-th measurement interval, and the logarithmic decrement of the back coating layer was acquired by using this curve. The measurement was performed in the environment of relative humidity of approximately 50%.

(3) Measurement of 1-Bromonaphthalene Contact Angle of Magnetic Layer

The 1-bromonaphthalene contact angle was measured regarding the surface of the magnetic layer by the following method by using a contact angle measuring device (contact angle measuring device Drop Master 700 manufactured by Kyowa Interface Science Co., Ltd.).

A tape sample obtained by cutting a certain length of the magnetic tape wound in a roll shape from an edge of the roll was placed on slide glass so that the surface of the back coating layer comes into contact with the surface of the slide glass. 2.0 μl of a liquid for measurement (1-bromonaphthalene) was dropped on the surface of the tape sample (surface of the magnetic layer), formation of stable liquid droplet from the dropped liquid was visually confirmed, a liquid droplet image was analyzed by contact angle analysis software FAMAS attached to the contact angle measurement device, and a contact angle formed by the tape sample and the liquid droplet was measured. The calculation of the contact angle was performed by a θ/2 method, an average value measured regarding 1 sample six times was set as the 1-bromonaphthalene contact angle. The measurement was performed in the environment of an atmosphere temperature of 25° C. and relative humidity of 25%, and the contact angle was obtained under the following analysis conditions.

Method: liquid droplet method (θ/2 method)
Droplet landing confirmation: automatic
Droplet landing confirmation line (distance from needle tip): 50 dot
Algorithm: automatic
Image mode: frame
Threshold level: automatic 3. Evaluation of Performance of Magnetic Tape (1) Electromagnetic Conversion Characteristics (Signal-to-Noise-Ratio (SNR)) and Amount of Reproduction Output During Repeated High-Speed Running in Environment of High Temperature and High Humidity Regarding each magnetic tape of the examples and the comparative examples, the electromagnetic conversion characteristics (SNR) and the amount of a decrease in reproduction output during the repeated running were measured by the following method by using a reel tester having a width of ½ inches (0.0127 meters) and including a fixed head. The measurement was performed in an environment of an atmosphere temperature of 32° C. and relative humidity of 80%.

A head/tape relative speed was set as 8.0 m/sec, a metal-in-gap (MIG) head (gap length of 0.15 μm, track width of 1.0 μm) was used as the recording head, and a recording current was set as an optimal recording current of each tape. As a reproducing head, a giant-magnetoresistive (GMR) head having an element thickness of 15 nm, a shield interval 0.1 μm, and a lead width of 0.5 μm was used. A signal having linear recording density of 300 kfci was recorded and measurement regarding a reproduction signal was performed with a spectrum analyzer manufactured by Shibasoku Co., Ltd. The unit, kfci, is a unit of linear recording density (not able to convert to the SI unit system). Regarding the signal, a signal which was sufficiently stabilized after starting the running of the magnetic tape was used. Under the conditions described above, the sliding of 500 passes was performed by sliding 1,000 m per 1 pass to perform the recording and reproducing. A ratio of an output value of a carrier signal and integrated noise of the entire spectral range was set as a SNR. Regarding the SNR of the first pass, Broadband-SNR (BB-SNR) was shown in Table 1 as a relative value in a case where the value of Comparative Example was set as a reference (0 dB).

An output value of a carrier signal of the first pass and an output value of a carrier signal of 500-th pass were respectively obtained, and a difference of "(output value of 500-th pass)−(output value of first pass)" was shown in Table 1 as the amount of a decrease in reproduction output during the repeated running.

(2) Evaluation of Amount of Head Attached Materials

After the measurement in the section (2), the surface of the reproducing head after reciprocating of 500 passes was observed with a differential interference microscope, and the amount of head attached materials was determined with the following criteria, in accordance with the size of the area in which the attached materials were confirmed in a microscopic image obtained with the differential interference microscope observation.

5 points: Substantially no head attached materials were observed.

4 points: a slight amount of head attached materials was observed.

3 points: Head attached materials were observed (the amount thereof is greater than that in a case of 4 points and smaller than that in a case of 2 points).

2 points: A large amount of head attached materials was observed.

1 point: An extremely large amount of head attached materials was observed.

The results described above are shown in Table 1.

TABLE 1-1

| | | Example 1 | Example 2 | Example 3 | Example 4 | Example 5 | Example 6 | Example 7 |
|---|---|---|---|---|---|---|---|---|
| | Colloidal silica average particle size (nm) | 80 | 80 | 80 | 80 | 80 | 80 | 40 |
| | Calender temperature (° C.) | 110 | 110 | 110 | 110 | 110 | 110 | 90 |
| | Cooling zone staying time | 1 second | 60 seconds | 180 seconds | 240 seconds | 1 second | 1 second | 180 seconds |
| | Burnishing treatment before curing process | Performed | Performed | Performed | Performed | Performed | Performed | Performed |
| | Burnishing treatment after curing process | Not performed | Not performed | Not performed | Not performed | Not performed | Not performed | Not performed |
| Magnetic layer forming composition | 1-Bromonaphthalene contact angle adjusting agent | Used | Used | Used | Used | Used | Used | Used |
| | Amount of stearic acid (part) | 2.5 | 2.5 | 2.5 | 2.5 | 3 | 3.5 | 3.5 |
| Magnetic layer | Center line average surface roughness Ra (nm) | 1.7 | 1.7 | 1.7 | 1.7 | 1.7 | 1.7 | 1.5 |
| | 1-Bromonaphthalene contact angle (°) | 46.4 | 46.2 | 46.5 | 46.6 | 50.3 | 53.1 | 52.9 |
| Back coating layer | Logarithmic decrement | 0.058 | 0.047 | 0.031 | 0.015 | 0.057 | 0.055 | 0.032 |
| | BB-SNR (dB) | 3.3 | 3.2 | 3.2 | 3.3 | 3.2 | 3.2 | 4.2 |
| | Head contamination (large: 1 ⇔ 5: small) | 5 | 5 | 5 | 5 | 5 | 5 | 5 |
| | Decrease in reproduction output (dB) | −0.9 | −0.8 | −0.5 | −0.3 | −0.5 | −0.4 | −0.5 |

TABLE 1-2

|  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Colloidal silica average particle size (nm) | | 120 | 80 | 80 | 80 | 80 | 80 | 80 |
| Calender temperature (° C.) | | 110 | 110 | 110 | 110 | 110 | 110 | 110 |
| Cooling zone staying time | | Not performed | Not performed | 1 second | 60 seconds | 240 seconds | Not performed | Not performed |
| Burnishing treatment before curing process | | Not performed | Not performed | Performed | Performed | Performed | Not performed | Not performed |
| Burnishing treatment after curing process | | Performed | Performed | Not performed | Not performed | Not performed | Performed | Performed |
| Magnetic layer forming composition | 1-Bromonaphthalene contact angle adjusting agent | None | None | None | None | None | Used | Used |
|  | Amount of stearic acid (part) | 1.5 | 1.5 | 1.5 | 1.5 | 1.5 | 2.5 | 3.5 |
| Magnetic layer | Center line average surface roughness Ra (nm) | 2.2 | 1.7 | 1.7 | 1.7 | 1.7 | 1.7 | 1.7 |
|  | 1-Bromonaphthalene contact angle (°) | 42.1 | 41.9 | 42.5 | 42.4 | 42.1 | 46.2 | 52.9 |
| Back coating layer | Logarithmic decrement | 0.080 | 0.079 | 0.058 | 0.046 | 0.015 | 0.079 | 0.080 |
|  | BB-SNR (dB) | 0.0 | 3.2 | 3.3 | 3.2 | 3.3 | 3.2 | 3.2 |
| Head contamination (large: 1 ⇔ 5: small) | | 5 | 1 | 2 | 3 | 4 | 2 | 3 |
| Decrease in reproduction output (dB) | | −0.8 | −4.0 | −2.8 | −2.0 | −2.0 | −2.7 | −1.7 |

From results shown in Table 1, it is possible to confirm that the magnetic tapes of Examples show a high SNR and in which a decrease in reproduction output during repeated high-speed running under an environment of a high temperature and high humidity is small.

The invention is effective in technical fields of magnetic tapes used as recording media for data storage.

What is claimed is:

1. A magnetic tape comprising:
a non-magnetic support;
a magnetic layer including ferromagnetic powder and a binding agent on one surface side of the non-magnetic support; and
a back coating layer including non-magnetic powder and a binding agent on the other surface side of the non-magnetic support,
wherein the center line average surface roughness Ra measured regarding a surface of the magnetic layer is equal to or smaller than 1.8 nm,
the contact angle with respect to 1-bromonaphthalene measured regarding the surface of the magnetic layer is 45.0° to 55.0°,
the logarithmic decrement acquired by a pendulum viscoelasticity test performed regarding the surface of the back coating layer is 0.010 to 0.060, and
the logarithmic decrement on the back coating layer side is determined by the following method;
securing a measurement sample of the magnetic tape with the measurement surface, which is the surface on the back coating layer side, facing upward on a substrate in a pendulum viscoelasticity tester;
disposing a columnar cylinder edge which is 4 mm in diameter and equipped with a pendulum 13 g in weight on the measurement surface of the measurement sample such that the long axis direction of the columnar cylinder edge runs parallel to the longitudinal direction of the measurement sample;
raising the surface temperature of the substrate on which the measurement sample has been positioned at a rate of less than or equal to 5° C./min up to 80° C.;
monitoring the displacement of the pendulum while it is oscillating to obtain a displacement-time curve for a measurement interval of greater than or equal to 10 minutes; and
obtaining the logarithmic decrement Δ from the following equation:

$$\Delta = \frac{\ln\left(\frac{A_1}{A_2}\right) + \ln\left(\frac{A_2}{A_3}\right) + \ldots \ln\left(\frac{A_n}{A_{n+1}}\right)}{n}$$

wherein the interval from one minimum displacement to the next minimum displacement is adopted as one wave period; the number of waves contained in the displacement-time curve during one measurement interval is denoted by n, the difference between the minimum displacement and the maximum displacement of the $n^{th}$ wave is denoted by An, and the logarithmic decrement is calculated using the difference between the next minimum displacement and maximum displacement of the $n^{th}$ wave ($A_{n+1}$ in the above equation).

2. The magnetic tape according to claim 1,
wherein the center line average surface roughness Ra is 1.2 nm to 1.8 nm.

3. The magnetic tape according to claim 2,
wherein the contact angle with respect to the 1-bromonaphthalene measured regarding the surface of the magnetic layer is 45.0° to 53.5°.

4. The magnetic tape according to claim 1,
wherein the contact angle with respect to the 1-bromonaphthalene measured regarding the surface of the magnetic layer is 45.0° to 53.5°.

5. The magnetic tape according to claim 1,
wherein the magnetic layer includes a nitrogen-containing polymer.

6. The magnetic tape according to claim 1,
wherein the magnetic layer includes one or more lubricants selected from the group consisting of fatty acid, fatty acid ester, and fatty acid amide.

7. The magnetic tape according to claim 1, further comprising:
a non-magnetic layer including non-magnetic powder and a binding agent between the non-magnetic support and the magnetic layer.

* * * * *